US007621739B2

(12) United States Patent
Tilton et al.

(10) Patent No.: US 7,621,739 B2
(45) Date of Patent: Nov. 24, 2009

(54) INJECTION MOLDING APPARATUS FOR PRODUCING AN ATOMIZER

(75) Inventors: Charles Tilton, Colton, WA (US); Jeffery Weiler, Liberty Lake, WA (US); Vivek Sahai, Pullman, WA (US); Harley West, Post Falls, ID (US)

(73) Assignee: Isothermal Systems Research, Inc., Liberty Lake, WA (US)

(*) Notice: Subject to any disclaimer, the term of this patent is extended or adjusted under 35 U.S.C. 154(b) by 852 days.

(21) Appl. No.: 11/188,580

(22) Filed: Jul. 25, 2005

(65) Prior Publication Data

US 2007/0029414 A1 Feb. 8, 2007

(51) Int. Cl.
*B29C 45/00* (2006.01)

(52) U.S. Cl. .................................... 425/572; 264/328.8

(58) Field of Classification Search ................. 425/572; 264/328.8

See application file for complete search history.

(56) References Cited

U.S. PATENT DOCUMENTS

| | | | | |
|---|---|---|---|---|
| 2,593,884 | A | 4/1952 | Ifield | |
| 3,394,889 | A | 7/1968 | Macguire-Cooper | |
| 3,680,793 | A | 8/1972 | Tate et al. | |
| 3,692,245 | A | 9/1972 | Needham et al. | |
| 3,762,652 | A | 10/1973 | Huling | |
| 3,838,728 | A | 10/1974 | Voegele | |
| 3,887,137 | A | 6/1975 | Nakamura et al. | |
| 4,624,414 | A | 11/1986 | Ferrazza | |
| 5,220,804 | A | 6/1993 | Tilton et al. | |
| 5,431,346 | A | 7/1995 | Sinaisky | |
| 5,435,884 | A | 7/1995 | Simmons et al. | |
| 5,622,489 | A | 4/1997 | Monro | |
| 5,731,542 | A | 3/1998 | Limper-Brenner et al. | |
| 5,740,967 | A | 4/1998 | Simmons et al. | |
| 5,773,038 | A * | 6/1998 | Hettinga | 425/145 |
| 5,860,602 | A | 1/1999 | Tilton et al. | |
| 5,875,972 | A | 3/1999 | Ren et al. | |
| 5,890,655 | A * | 4/1999 | Collias et al. | 239/107 |
| 5,933,700 | A | 8/1999 | Tilton et al. | |
| 5,934,555 | A | 8/1999 | Dobbeling et al. | |
| 5,951,882 | A | 9/1999 | Simmons et al. | |
| 6,016,969 | A | 1/2000 | Tilton et al. | |
| 6,024,301 | A | 2/2000 | Hurley et al. | |
| 6,109,547 | A * | 8/2000 | Ritsche | 239/337 |
| 6,136,243 | A | 10/2000 | Mehregany et al. | |
| 6,382,533 | B1 | 5/2002 | Mueller et al. | |
| 6,405,945 | B1 | 6/2002 | Dobrin | |
| 6,506,334 | B1 * | 1/2003 | Ellison et al. | 264/510 |
| 6,554,201 | B2 * | 4/2003 | Klimowicz et al. | 239/4 |
| 6,623,677 | B1 * | 9/2003 | Smith et al. | 264/132 |

(Continued)

*Primary Examiner*—Tim Heitbrink
(74) *Attorney, Agent, or Firm*—Lee & Hayes, PLLC

(57) ABSTRACT

Representative embodiments provide for corresponding fluid atomizer bodies, each generally defining a fluidicly communicative interior cavity. The interior cavity is typically defined by an entry passageway portion, a chamber portion, a plurality of feeder passageways that are tangentially disposed to and fluidly coupled with the chamber portion, and an exit passageway portion fluidly coupled to the chamber portion. In one embodiment, an upper body portion and a lower body portion are bonded together to define a complete fluid atomizer body. Another embodiment provides for producing one or more fluid atomizer bodies by a way of injection molding. A method provides for spraying or sputtering atomized droplets of an electrically non-conductive coolant onto an electrical apparatus using one or more fluid atomizer bodies.

14 Claims, 16 Drawing Sheets

U.S. PATENT DOCUMENTS

| | | | | |
|---|---|---|---|---|
| 6,626,330 | B2 * | 9/2003 | Ritsche | 222/153.02 |
| 6,708,907 | B2 | 3/2004 | Fochtman et al. | |
| 6,764,292 | B2 * | 7/2004 | Hendry | 425/130 |
| 6,899,290 | B2 | 5/2005 | Varble et al. | |
| 6,915,962 | B2 * | 7/2005 | Power et al. | 239/102.2 |
| 7,455,248 | B2 * | 11/2008 | Kablik et al. | 239/654 |

* cited by examiner

INJECTION MOLDING APPARATUS FOR PRODUCING AN ATOMIZER

BACKGROUND

Atomization refers to dispersing a liquid as a stream or spray of relatively minuscule droplets. Atomization and apparatus for atomizing liquids are useful in a wide variety of endeavors wherein deposition of a liquid material over a surface area is required. Numerous factors important to atomization include overall droplet size, spray pattern or dispersal, overall flow rate through the liquid atomizing device (referred to as an atomizer), etc. These and other factors are determined to a significant extent by the geometric characteristics of the atomizer.

Another important consideration in this field is cost of production. This area of concern has suffered in the past due to the relatively high cost of producing atomizers of suitable performance. The general experience has been that such atomizers are relatively complex in form and of tight dimensional tolerances that are difficult (and thus costly) to produce, especially in quantity.

Therefore, it is desirable to provide liquid atomizers that exhibit suitable performance characteristics, methods for their use, and methods for producing them in quantity at relatively low cost.

SUMMARY

One embodiment provides for a fluid atomizer, the fluid atomizer including a body that defines an exterior surface and a fluidicly communicative interior cavity. In turn, the interior cavity is defined by an entry passageway portion that extends through the exterior surface of the body, and a chamber defined by a cylindrical portion and a tapered portion. The chamber is fluidly coupled to the entry passageway portion. The interior cavity, as defined by the fluid atomizer, is also defined by at least one feeder passageway portion. Each feeder passageway extends tangentially from the cylindrical portion of the chamber outward through the exterior surface of the fluid atomizer body. Furthermore, the interior cavity is defined by an exit passageway portion. The exit passageway portion extends from the tapered portion of the chamber through the exterior surface of the fluid atomizer body.

Another embodiment provides for an injection mold that is configured to form at least one portion of one or more fluid atomizer bodies. Also, the injection mold is further configured such that each fluid atomizer body defines an exterior surface and a fluidicly communicative interior cavity. Furthermore, the interior cavity of each fluid atomizer body is defined by an entry passageway portion that extends through the exterior surface of the fluid atomizer body. The interior cavity is also defined by a chamber portion that is fluidly coupled to the entry passageway portion. The chamber of each interior cavity is defined by a cylindrical portion and a tapered portion. The interior cavity of each fluid atomizer body is also defined by at least one feeder passageway portion. Each feeder passageway portion extends tangentially from the cylindrical portion of the chamber through the exterior surface of the corresponding fluid atomizer body. Furthermore, the interior cavity is defined by an exit passageway portion that extends from the tapered portion of the chamber portion outward through the exterior surface of the fluid atomizer body.

Yet another embodiment provides for a method of atomizing a fluid, the method including the step of providing a fluid atomizer body. The fluid atomizer body, in turn, defines a fluid entry passageway, and a fluid swirling chamber that is fluidly coupled to the fluid entry passageway. The fluid swirling chamber defines a cylindrical portion and a tapered exit portion. The fluid atomizer body also defines a plurality of fluid passageways each being tangentially disposed, and fluidly coupled, to the cylindrical portion of the fluid swirling chamber. The fluid atomizer body also defines a fluid exit passageway, which is fluidly coupled to the tapered exit portion of the fluid swirling chamber. The method also includes the step of introducing a flow of fluid into the fluid entry passageway, and into each of the plurality of fluid feeder passageways. The method further includes swirling the fluid within the fluid swirling chamber of the fluid atomizer body. Furthermore, the method includes the step of ejecting atomized droplets of the fluid from the fluid exit passageway of the fluid atomizer body.

These and other aspects and embodiments will now be described in detail with reference to the accompanying drawings, wherein:

DETAILED DESCRIPTION

In representative embodiments, the present teachings provide various apparatus for atomizing a liquid, wherein each such apparatus is referred to as a "liquid atomizer", "fluid atomizer", or just simply an "atomizer". The present teachings also provide methods of using such fluid atomizers in various operations such as the evaporative cooling of electrical equipment. The present teachings further provide apparatus for forming various embodiments of a fluid atomizer by way of injection molding.

In a typical embodiment of the present teachings, an atomizer device or body is provided, wherein the atomizer defines an exterior surface and a "fluidly continuous" or "fluidicly communicative" interior cavity. Either of these terms refers to the fact that such an interior cavity is configured to permit a fluid to completely 'wet' all of the interior surfaces (walls, passageways, etc.) that define the interior cavity. Thus, during typical use, the interior cavity of such an atomizer is substantially filled with a fluid substance, and all voids or areas, or spaces are generally wetted by the fluid.

Furthermore, typical use of an atomizer according to the present teachings results in a dispersal or spray of relatively minuscule (i.e., tiny) droplets of liquid from a discharge or exit port of the atomizer device. Such a spray of droplets can be directed to striking or coating a surface of another entity such as, for example, an object to be cooled, an object to be lubricated, an object to be stained or painted, etc.

Figure 1:
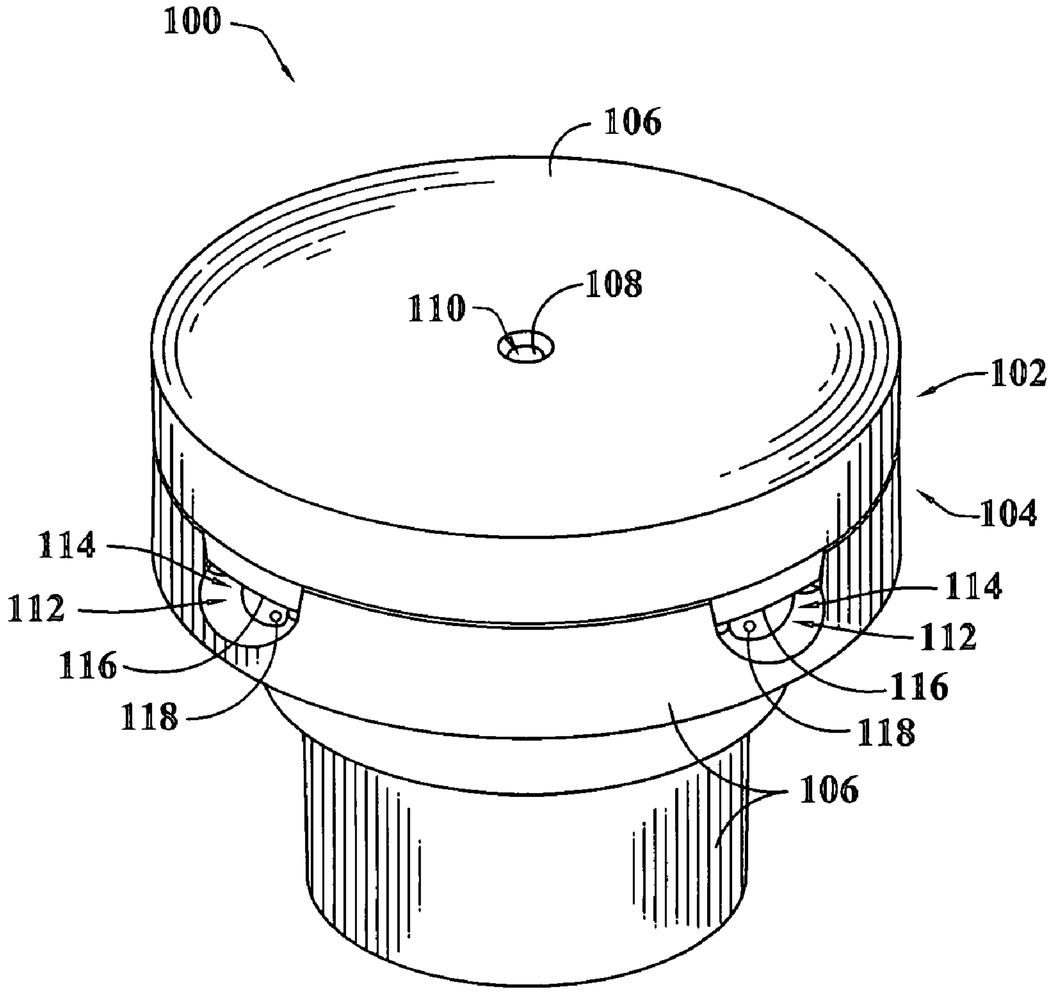
FIG. 1 is an isometric view depicting an atomizer according to one embodiment.

Turning now to FIG. 1, an isometric view depicts an atomizer 100 in accordance with an embodiment of the present invention. As referred to herein, the atomizer 100 can also be considered an atomizer body. As depicted in FIG. 1, the atomizer 100 is comprised of an upper body portion 102 and a lower body portion 104 that are respectively formed and fused or otherwise suitably joined or bonded together, so as to define the atomizer 100 as a one-piece entity. In another embodiment (not shown), the atomizer 100 can be formed as a continuous one-piece structure. In any case, the atomizer 100 (i.e., the upper body portion 102 and/or the lower body portion 104) can be formed from any suitable material such as, for example, thermoplastic, brass, aluminum, stainless steel, etc. Any other suitable material can also be used to form the atomizer 100. The atomizer 100 defines an exterior surface 106.

The atomizer 100 also defines an entry passageway 108. As depicted in FIG. 1, the upper body portion 102 defines the entry passageway 108 as an aperture extending completely therethrough. In another embodiment (not shown), the entry passageway 108 is defined by a continuous one-piece structure (i.e., body) of the atomizer 100. In any case, the entry passageway 108 defines a fluid conduit that is fluidly coupled to, and is considered a portion of, a fluidicly communicative (i.e., fluidly continuous) interior cavity defined by the atomizer 100. The interior cavity defined by the atomizer 100 is discussed in greater detail hereinafter. As further depicted in FIG. 1, the entry passageway 108 is defined by a circular cross-sectional geometry 110. Other suitable cross-sectional geometries can also be used (one example of which is depicted in FIG. 2A).

The atomizer 100 also defines a plurality of feeder passageways 112. As depicted in FIG. 1, each feeder passageway 112 is defined in part by the upper body portion 102 and in part by the lower body portion 104. In another embodiment (not shown), each feeder passageway 112 is defined by a continuous one-piece structure of the atomizer 100. Each feeder passageway 112 defines a fluid conduit that is fluidly coupled to, and is considered a portion of, the interior cavity defined by the atomizer 100. At least a portion of each feeder passageway 112 is defined by a cross-sectional geometry 114. As depicted in FIG. 1, the cross-sectional geometry 114 comprises a linear perimeter portion 116 and a curvilinear portion 118. Other cross-sectional geometries 114 can also be used and are described in further detail hereinafter.

Figure 2:
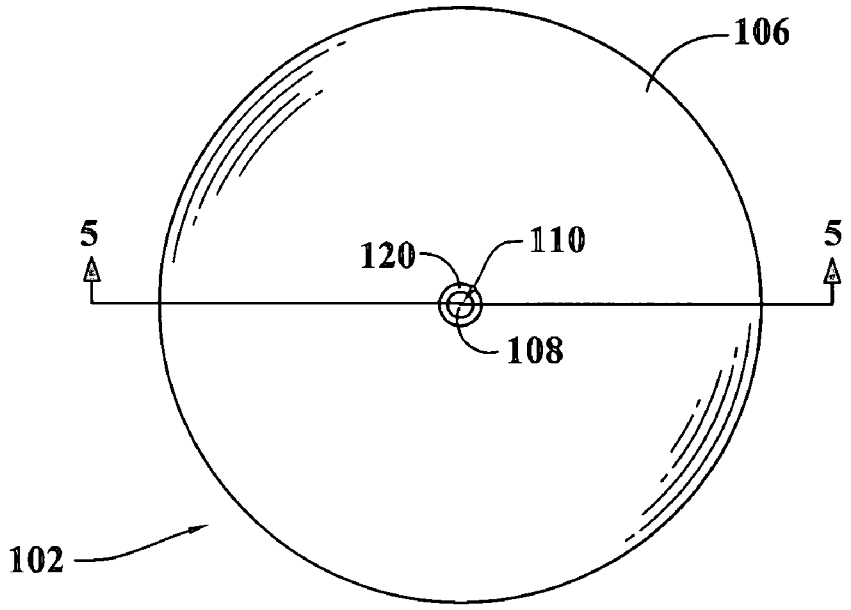
FIG. 2 is a plan view depicting details of a first body portion of the atomizer of FIG. 1.

FIG. 2 is a plan view depicting details of the upper body portion 102 of the atomizer 100 of FIG. 1. As depicted in FIG. 2, the observer is looking directly onto the exterior surface 106 of the upper body portion 102. Also depicted in FIG. 2 are the entry passageway 108 and the cross-sectional geometry 110 thereof as described above in regard to FIG. 1. The upper body portion 102 defines a radius-edged orifice portion 120 of the entry passageway 108. Other orifice portions (not shown) can also be used such as, for example, a square-edged orifice portion, a tapered (linear-sloped) orifice portion, etc.

Figure 2A:
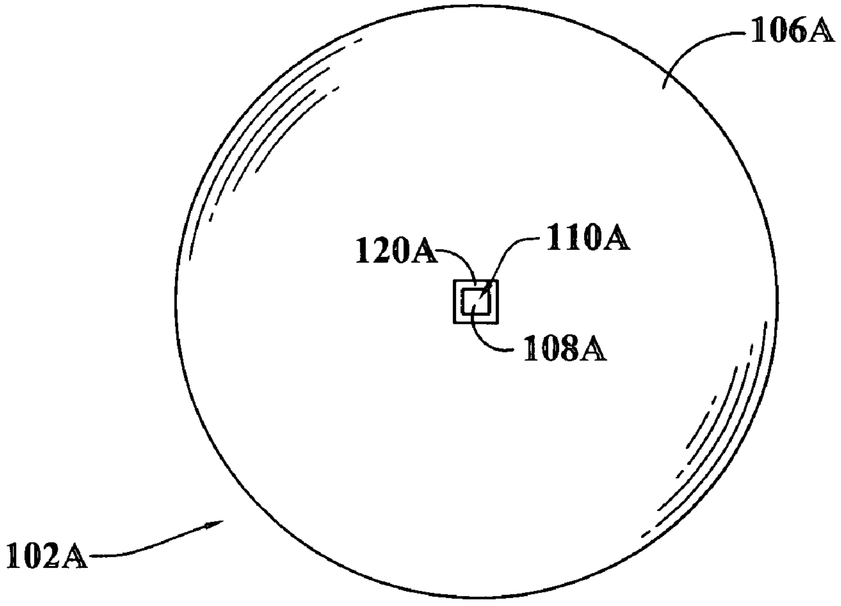
FIG. 2A is a plan view depicting details of a first body portion according to another embodiment.

FIG. 2A is a plan view depicting details of an upper body portion 102A according to another embodiment. The upper body portion 102A defines an outer surface 106A that is substantially analogous to the outer surface 106 of the upper body portion 102 of FIG. 2. Also, the upper body portion 102A defines an entry passageway 108A. The entry passageway 108A is, in turn, defined by a square cross-sectional geometry 110A and a sloped edge orifice portion 120A. Other aspects of the manufacture, configuration and use of the upper body portion 102A are substantially the same as described herein in regard to the upper body portion 102 of FIGS. 1-2, 3, 5, etc. Thus, the upper body portion 102A represents at least one variation on the upper body portion 102 that can be used in accordance with the present teachings.

Figure 3:
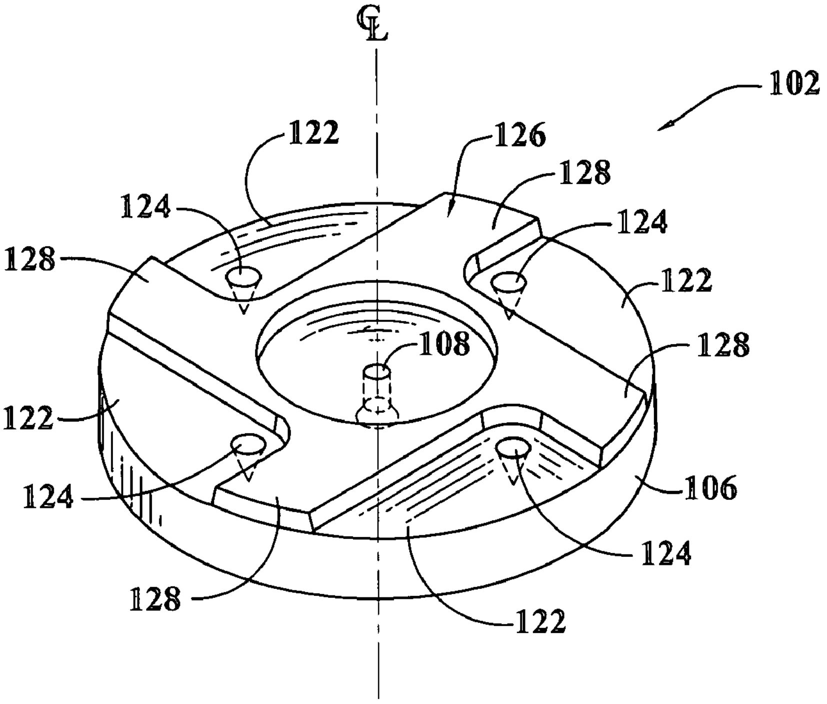
FIG. 3 is an isometric view depicting details of a first body portion of the atomizer of FIG. 1.

FIG. 3 is an isometric view depicting details of the upper body portion 102 of the atomizer 100 of FIG. 1. As depicted in FIG. 3, the observer is looking generally toward underside details defined by the upper body portion 102. Such underside details of the upper body portion 102 are understood to define various features of the interior cavity of the atomizer 100. The upper body portion 102 defines four symmetrically arranged upper contact areas 122. Other upper contact area 122 counts, corresponding to other embodiments of atomizer (not shown), can also be used. Each upper contact area 122 is configured to contact a corresponding lower contact area 152 (refer to FIG. 4) when the upper body portion 102 is bonded (or fused) to the lower body portion 104 to define the complete atomizer 100.

Referring to FIG. 3, the upper body portion 102 further defines four recessed portions 124. Each recessed portion 124 is defined within a corresponding upper contact area 122.

Other recessed portion 124 counts can also be used. As depicted in FIG. 3, each recessed portion 124 is generally defined by a conical depression in the upper body portion 102. Other suitable geometries (not shown) of recessed portions can also be used. Each recessed portion 124 is configured to receive a corresponding raised portion 154 (refer to FIG. 4) when the upper body portion 102 is bonded to the lower body portion 104 to define the complete atomizer 100. In this way, the recessed portions 124 (FIG. 3) and the corresponding raised portions 154 (FIG. 4) provide index points to ensure proper alignment (i.e., registration) of the upper body portion 102 with respect to the lower body portion 104 during assembly. In another embodiment (not shown) of the atomizer 100, the recessed portions 124 (FIG. 3) and the raised portions 154 (FIG. 4) are omitted altogether, wherein the upper contact portions 122 (FIG. 3) and the lower contact portions 152 (FIG. 4) are respectively defined as generally smooth, planar regions.

Still referring to FIG. 3, the upper body portion 102 defines a raised feature 126. The raised feature 126 defines four raised planar surfaces 128. Other raised planar surface 128 counts corresponding to other embodiments of atomizer (not shown) can also be used. In any case, the raised feature 126 is configured to define a number of raised planar surfaces 128 in one-to-one correspondence with the number of feeder passageways 112 (FIG. 1) defined by a particular embodiment of atomizer. As depicted in FIG. 3, the four raised planar surfaces 128 are symmetrically and tangentially arranged with respect to a central axis "CL" of the upper body portion 102 of the atomizer 100. Each raised planar surface 128 defines a flat, smooth, interior wall surface for a corresponding one of the feeder passageways 112 (FIG. 1). Thus, each raised planar surface 128 (FIG. 3) also defines the linear perimeter portion 116 (FIG. 1) of the cross-sectional geometry 114 of a corresponding feeder passageway 112.

Figure 4:
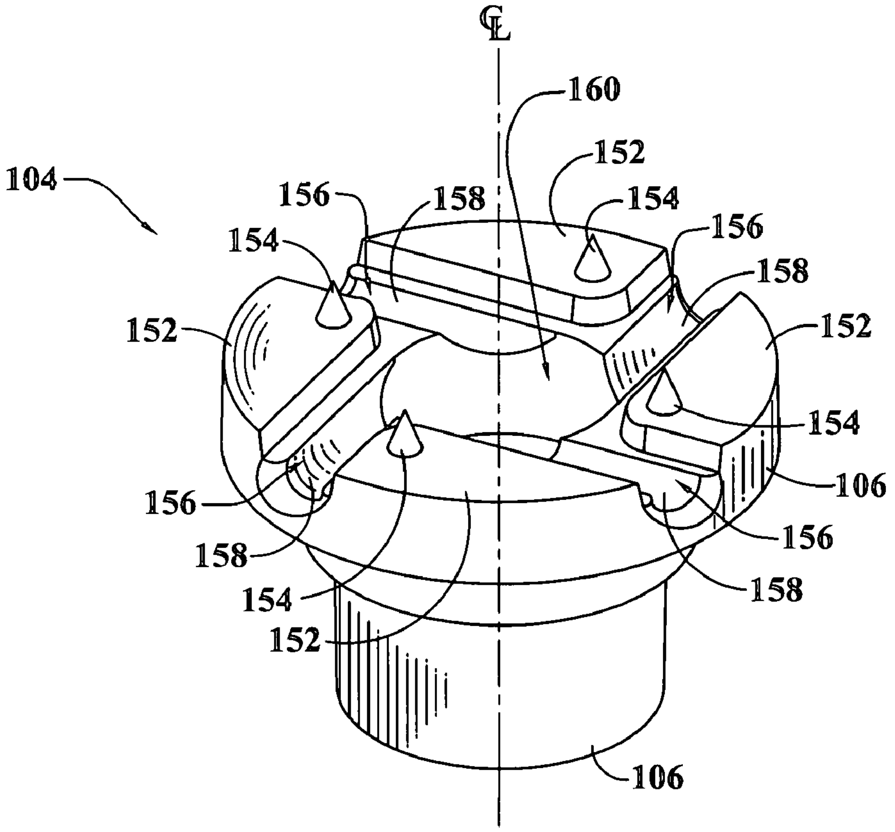
FIG. 4 is an isometric view depicting details of a second body portion of the atomizer of FIG. 1.

FIG. 4 is an isometric view depicting details of the lower (second) body portion 104 of the atomizer 100 of FIG. 1. As depicted in FIG. 4, the observer is looking generally toward upper-end and interior details defined by the lower body portion 104. Such upper-end and interior details of the lower body portion 104 are understood to define various features of the interior cavity of the atomizer 100. As further depicted in FIG. 4, the lower body portion 104 defines four symmetrically arranged lower contact areas 152 as introduced above in regard to the description of FIG. 3. Other lower contact area 152 counts, corresponding to other embodiments of atomizer (not shown), can also be used. Each lower contact area 152 (FIG. 4) is configured to contact a corresponding upper contact area 122 (FIG. 3) when the lower body portion 104 is bonded (or fused) to the upper body portion 102 so as to define the complete atomizer 100.

Again referring to FIG. 4, the lower body portion 104 further defines four raised portions 154. Each raised portion 154 is defined within a corresponding lower contact area 152. Other raised portion 154 counts can also be used. As depicted in FIG. 4, each raised portion 154 is generally defined by a conical portion extending away from the lower body portion 104. Other suitable geometries (not shown) of raised portions can also be used. Each raised portion 154 is configured to be received in a corresponding recessed portion 124 (FIG. 3) when the upper body portion 102 is bonded to the lower body portion 104 to define the atomizer 100. In some embodiments of atomizer 100, the lower body portion 104 and the upper body portion 102 are formed from a suitable thermoplastic (or other material) such that sonic welding and/or laser welding can be employed to fusibly bond each of the raised portions 154 (FIG. 4) within a corresponding recessed portion 124 (FIG. 3) during assembly of the upper and lower body portions 102 and 104, respectively, so as to define the resulting atomizer 100 as a singular entity. In another embodiment of the atomizer 100, only (one or more) raised portions 154 (FIG. 4) are present and any corresponding recessed portions 124 (FIG. 3) are omitted. In such an embodiment, the raised portion or portions 154 (FIG. 4) are substantially melted during sonic welding (or laser welding, etc.) of the lower body portion 104 to the upper body portion 102 (FIG. 3) so as to fully define the atomizer 100. Thus, such raised portions 154 can be thought of as fusible (i.e., melt-able, or deformable) masses used during the bonding process.

Still referring to FIG. 4, the lower body portion 104 also defines four channels 156. Other channel 156 counts corresponding to other embodiments of atomizer (not shown) can also be used. In any case, the lower body portion 104 is configured to define a number of channels 156 in one-to-one correspondence with the number of feeder passageways 112 (FIG. 1) defined by a particular embodiment of atomizer. Each of the channels 156 (FIG. 4) is defined by a curved surface (i.e., a trough-like depression) 158. Each curved surface 158 defines a curved, smooth, interior wall surface for a corresponding one of the feeder passageways 112 (FIG. 1). Thus, each curved surface 158 defines the curvilinear perimeter portion 118 (FIG. 1) of the cross-sectional geometry 114 of a corresponding feeder passageway 112. As depicted in FIG. 4, each curved surface 158 is substantially semicircular in cross-sectional geometry. Other cross-sectional geometries can also be defined, examples of which are discussed in further detail hereinafter. The four channels 156 are symmetrically and tangentially arranged with respect to a central axis "CL" of the lower body portion 104 of the atomizer 100.

It is to be understood that when the upper body portion 102 (FIG. 2) is joined or bonded to the lower body portion 104 (FIG. 4), so as to define a complete (i.e., fully assembled) atomizer 100 (FIG. 1), each of the four curved surfaces 158 (FIG. 4) is cooperatively disposed to a corresponding raised planer surface 128 (FIG. 3) so as to define a smooth, continuous, cross-sectional perimeter for a corresponding feeder passageway 112 (FIG. 1). In this way, each feeder passageway 112 can be considered an enclosed fluid conduit that extends through the exterior surface 106 and into the interior cavity of the atomizer 100. As collectively depicted in FIGS. 1-4, the plurality of feeder passageways 112 lie in a mutually common plane. However, in another embodiment of fluid atomizer, such feeder passageways can be defined so as to intersect a chamber of a fluidicly communicative interior cavity at an acute angle with respect to a central axis of that chamber. Such an embodiment is further described hereinafter in regard to FIG. 9.

Again referring to FIG. 4, the lower body portion 104 defines a chamber 160. In the context of a fully assembled atomizer 100 (FIG. 1), the chamber 160 (FIG. 4) is fluidly coupled to each feeder passageway 112 (FIG. 1) and the entry passageway 108, and is considered to be a portion of the fluidicly communicative interior cavity defined by the atomizer 100 (FIG. 1). As depicted in FIG. 4, the chamber 160 defines a substantially cylindrical portion 162 (i.e., of substantially circular cross-sectional geometry) and a tapered (or funnel-like) portion 164 that are respectively further described hereinafter in association with FIG. 5. The cylindrical portion 162 is also referred to herein as a first portion 162. In another embodiment (not shown), the chamber 160 defines a first portion (i.e., 162) of a different suitable cross-sectional geometry such as, for example, elliptical, oval, etc.). Furthermore, each of the channels 156 extends tangentially away from the cylindrical portion 162 of the chamber 160.

Figure 5:
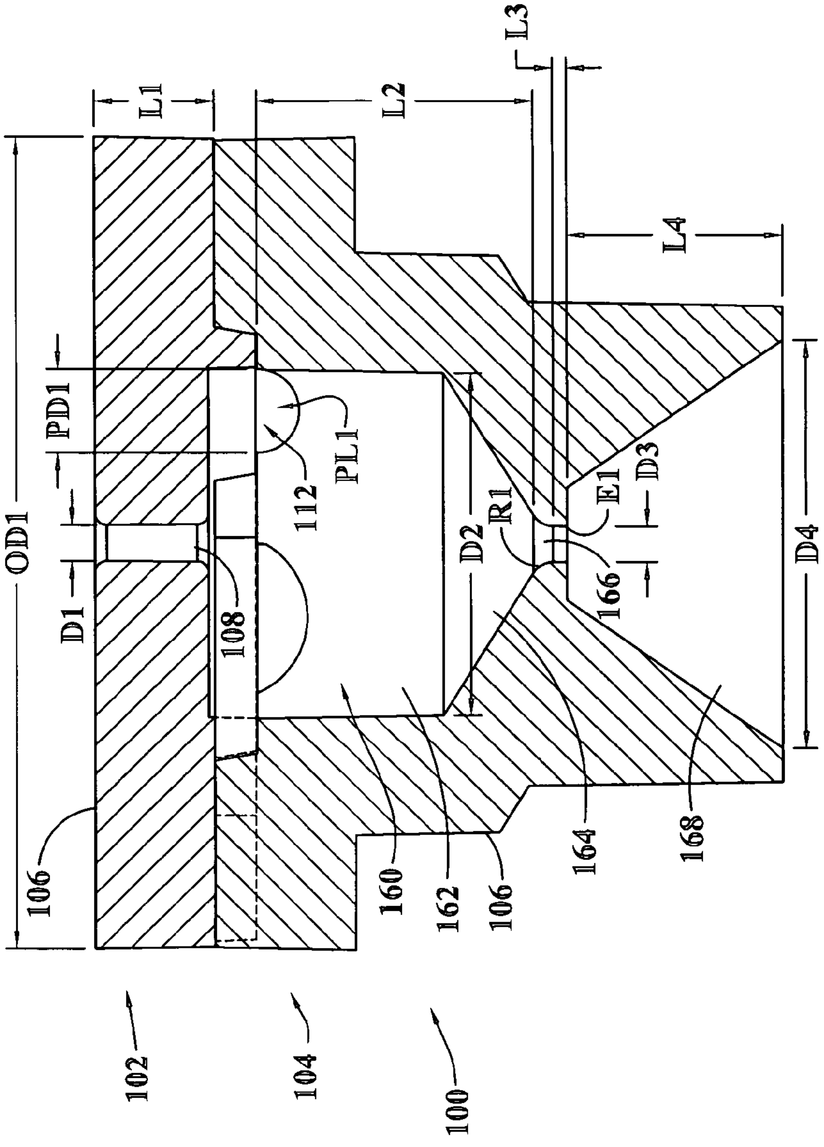
FIG. 5 is an elevation sectional view depicting the atomizer of FIG. 1.

FIG. 5 is an elevation sectional view depicting the atomizer 100. As depicted in FIG. 5, the upper body portion 102 and the lower body portion 104 are in an assembled (i.e., mated and bonded) condition such that the atomizer 100 is fully defined thereby. The upper body portion 102 is defined by an outer diameter "OD1". In one embodiment, the outer diameter OD1 is defined to be 0.125 inches. Other suitable outer diameters OD1 can also be defined and used.

The entry passageway 108, as defined by the upper body portion 102, is defined by a diameter "D1" and a length "L1". In one embodiment, the diameter D1 is defined to be 0.0083 inches, while the length L1 is defined to be 0.021 inches. Other suitable diameters D1 and/or lengths L1 of the entry passageway 108 can also be defined and used. The entry passageway 108 length L1 can also be referred to as a height.

Each feeder passageway 112 (one is shown in FIG. 5) is defined by a semicircular passageway diameter "PD1" and a passageway length "PL1". As depicted in FIG. 5, the passageway length PL1 of each feeder passageway 112 extends from the cylindrical portion 162 of the chamber 160 outward through the exterior surface 106 of the atomizer 100 (i.e., along an axis perpendicular to the plane of the section). In one embodiment, the diameter PD1 is defined to be 0.015 inches, while the passageway length PL1 is defined to be 0.0545 inches. Other suitable diameters PD1 and/or passageway lengths PL1 of each feeder passageway 112 can also be used.

The chamber 160, as defined by the lower body portion 104, is defined by a diameter "D2" and a length "L2". In one embodiment, the diameter D2 is defined to be 0.063 inches, while the length L2 is defined to be 0.048 inches. Other suitable diameters D2 and/or lengths L2 of the chamber 160 of the atomizer 100 can also be defined and used. The chamber 160 length L2 can also be referred to as a height.

The atomizer 100 also defines an exit passageway 166. As depicted in FIG. 5, the exit passageway 166 is defined by the lower body portion 104. However, in another embodiment (not shown), the exit passageway 166 can be defined by a one-piece atomizer body 100. As depicted in FIG. 5, the exit passageway 166 is defined by a radius-edge entry portion "R1", a right-angle (or square) edge exit portion "E1", a diameter "D3" and a length "L3". In one embodiment, the diameter D3 is defined to be 0.021 inches, while the ratio of length L3 to diameter D3 (i.e., L3/D3) is defined to be 0.52, and the radius of the radius-edge entry portion R1 is defined to be 0.25 times the diameter D3. Other suitable diameters D3, lengths L3 and/or radiuses of the radius-edge entry portion R1 can also be defined and used. In any case, the exit passageway 166 is fluidly coupled to the tapered portion 164 of the chamber 160, and is considered to be a portion of the fluidicly communicative interior cavity defined by the atomizer 100. The exit passageway 166 length L3 can also be referred to as a height.

The atomizer 100 further defines an outer expansion 168. As depicted in FIG. 5, the outer expansion 168 is defined by the lower body portion 104. In another embodiment (not shown), the outer expansion 168 is defined by a one-piece atomizer body 100. The outer expansion 168 is substantially frustum-like (i.e., generally conical) in overall geometry and is defined by a diameter "D4" and a length "L4". In one embodiment, the diameter D4 is defined to be 0.0738 inches, while the length L4 is defined to be 0.0384 inches. Other suitable diameters D4 and/or lengths L4 can also be defined and used. The outer expansion 168 length L4 can also be referred to as a height. The outer expansion 168 generally serves to define the spray pattern of atomized liquid droplets as they exit the atomizer 100.

The atomizer 100, the elements, features and/or aspects of which are described above in regard to FIGS. 1-5, sets forth one specific example in accordance with the present teachings, and has been demonstrated in tests to exhibit atomizing performance superior to prior art atomizers. As such, the atomizer 100 defines a fluidicly communicative interior cavity of particular features, geometry and dimensions. Variations on those features, geometry and/or corresponding dimensions can also be used. While some dimensions of the atomizer 100 are respectively defined above in terms of ratios, multiples and/or fractions of other respectively defined dimensions, it is to be understood that other definitions for such dimensions can also be used and which also result in atomizing performance superior to prior art atomizers. In the interest of convenience, selected ones of the typical ranges, and typical dimensions, of the dimensions of the atomizer 100 are summarized in Table 1 below:

TABLE 1

| Feature or Dimension | Typical Range | Typical Dimension |
|---|---|---|
| Outer body 102 diameter OD1 | 0.1-0.2 inches | 0.125 inches |
| Entry passageway 108 diameter D1 | 0.007-0.009 inches | 0.0083 inches |
| Entry passageway 108 length L1 | 0.015-0.03 inches | 0.021 inches |
| Feeder passageway 112 diameter PD1 | 0.01-0.03 inches | 0.015 inches |
| Feeder passageway 112 length PL1 | 0.04-0.05 inches | 0.0545 inches |
| Chamber 160 diameter D2 | 0.05-0.07 inches | 0.063 inches |
| Chamber 160 length L2 | 0.035-0.06 inches | 0.0545 inches |
| Exit passageway 166 diameter D3 | 0.004-0.009 inches | 0.0083 inches |
| Exit passageway 166 radius-edge R1 | R1/D3 = 0.0-1.0 | R1/D3 = 0.5 |
| Exit passageway 166 length L3 | L3/D3 = 0.4-1.0 | L3/D3 = 0.52 |
| Outer expansion 168 diameter D4 | .05-0.1 inches | .0738 inches |
| Outer expansion 168 length L4 | .025-0.5 inches | .0384 inches |
| Tangency of Feeder Ports | .022-0.26 inches | 0.024 inches |
| Outer expansion 168 angle | 90 to 45 degrees | 70 degrees |

Figure 5A:
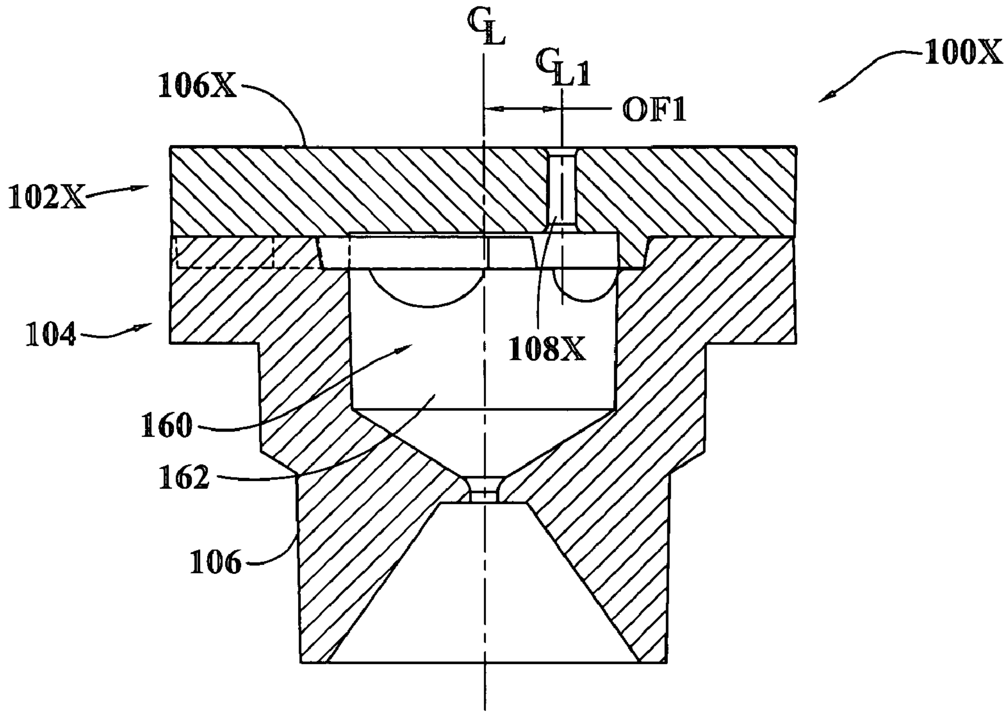
FIG. 5A is an elevation sectional view depicting an atomizer in accordance with another embodiment.

FIG. 5A depicts an elevation sectional view of an atomizer 100X. The atomizer 100X includes (is defined by) an upper body portion 102X and a lower body portion 104 that are bondably assembled so as to define the atomizer 100X as a complete and singular entity. The lower body portion 104 is as described above in regard to FIGS. 1 and 4-5. Thus, and as depicted in FIG. 5A, the lower body portion 104 defines an interior cavity including a chamber 160 and a cylindrical portion 162. The chamber 160, in turn, is defined by (i.e., is symmetrically defined about) a centerline "CL".

The upper body portion 102X is defined by an outer surface 106X. The upper body portion 102X further defines an entry passageway 108X. The entry passageway 108X defines a fluid conduit that extends through the outer surface 106X and into fluid communication with the chamber 160 of the atomizer 100X. The entry passageway 108X is defined by a corresponding centerline "CL1". The chamber centerline CL and the passageway centerline CL1 are mutually parallel but offset from each other by a distance "OF1". Thus, the respective centerlines CL and CL1 are non-collinear. In one embodiment, the offset distance OF1 is defined by 0.010 inches. Other suitable offset distances OF1 can also be used. Other aspects and features (and variation thereon) of the upper body portion 102X of FIG. 5A are substantially as described herein with respect to the upper body portion 102 of FIGS. 1-2, 3, 5, etc.

Typical use of the atomizer 100X of FIG. 5A is substantially the same as described herein in regard to the atomizer 100 of FIGS. 1-5, 7, etc. However, the off-center (i.e., eccentric) orientation of the entry passageway 108X with respect to the chamber 160 results in the flow of liquid therethrough that aids in the overall mixing or churning of liquid within the chamber 160.

Figure 5B:
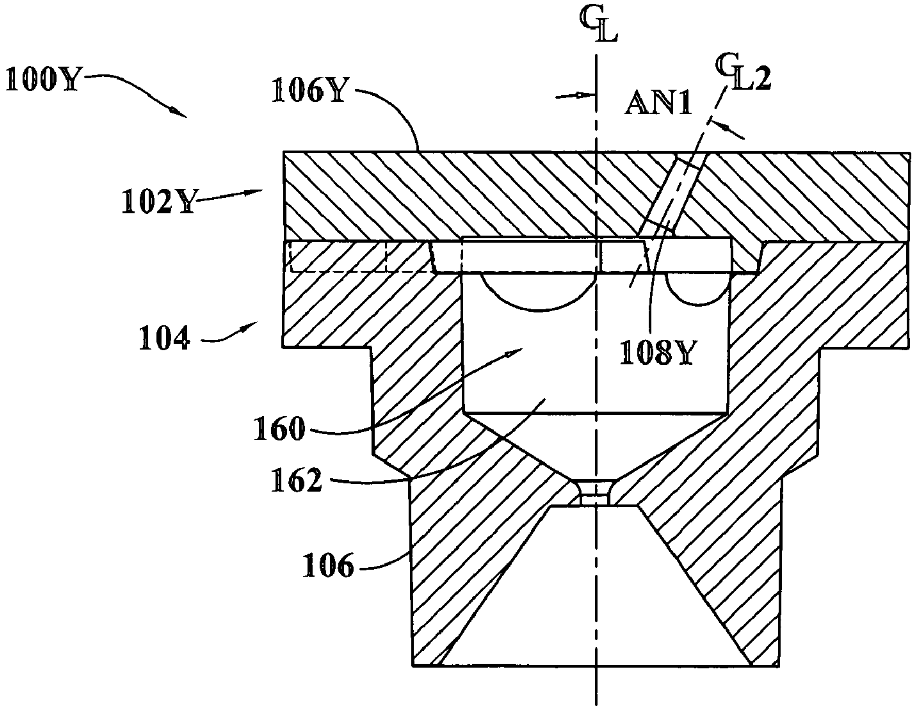
FIG. 5B is an elevation sectional view depicting an atomizer in accordance with still another embodiment.

FIG. 5B depicts an elevation sectional view of an atomizer 100Y. The atomizer 100Y is defined by an upper body portion 102Y and a lower body portion 104 that are bonded and assembled so as to define the atomizer 100Y as a singular entity. The lower body portion 104 is as described above in regard to FIGS. 1 and 4-5, etc. Thus, and as depicted in FIG. 5B, the lower body portion 104 defines an interior cavity including a chamber 160 and a cylindrical portion 162. The chamber 160, in turn, is defined by a centerline "CL".

The upper body portion 102Y is defined by an outer surface 106Y. The upper body portion 102Y further defines an entry passageway 108Y. The entry passageway 108Y defines a fluid conduit that extends through the outer surface 106Y and into fluid communication with the chamber 160 of the atomizer 100Y. The entry passageway 108Y is defined by a corresponding centerline "CL2". As further depicted in FIG. 5B, an angle "AN1" is defined by the chamber centerline CL and the passageway centerline CL2. Thus, the chamber centerline CL and the passageway centerline CL2 are non-parallel. In one embodiment, the angle AN1 is defined to be 3 degrees of arc. Other angular and/or offset relationships between the chamber centerline CL and the entry passageway 108Y can also be defined and used. Other aspects and features (and variation thereon) of the upper body portion 102Y of FIG. 5B are substantially as described herein with respect to the upper body portion 102 of FIGS. 1-2, 3, 5, etc.

Typical use of the atomizer 100Y of FIG. 5B is substantially the same as described herein in regard to the atomizer 100 of FIGS. 1-5, 7, etc. However, the angled relationship of the entry passageway 108Y with respect to the centerline CL tends to increase the swirl of liquid within the chamber 160.

Figure 6C:
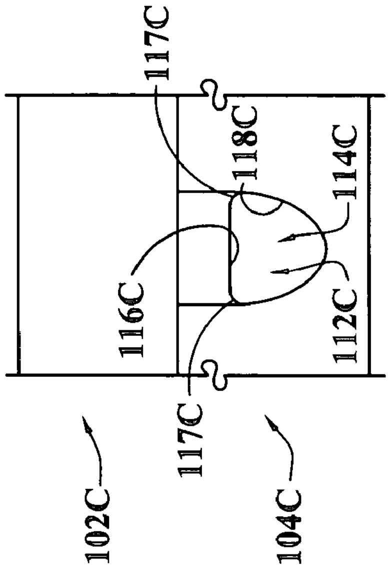
FIG. 6C is an elevation detail view depicting feeder passageway geometry in accordance with still another embodiment.
Figure 6B:
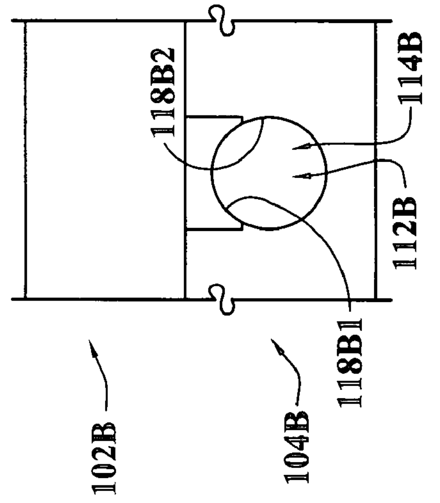
FIG. 6B is an elevation detail view depicting feeder passageway geometry in accordance with another embodiment.
Figure 6A:
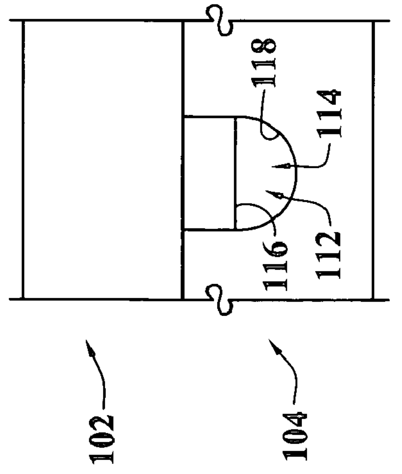
FIG. 6A is an elevation detail view depicting the feeder passageway geometry of the atomizer of FIG. 1.

FIG. 6A depicts a side elevation detail view of the feeder passageway 112 of the atomizer 100 of FIG. 1. As depicted in FIG. 6A, the viewer is looking into the passageway 112 from outside of the atomizer 100 inward toward the chamber 160 (FIGS. 4-5). As described above, the feeder passageway 112 (FIG. 6A) is defined by a cross-sectional geometry 114, which in turn is defined by a linear perimeter portion 116 and a curvilinear perimeter portion 118. As depicted in FIG. 6A, the curvilinear perimeter portion 118 of the atomizer 100 is defined by a semicircle. In this way, the cross-sectional geometry 114 has the overall form of a segment of a circle (or disk). However, it is to be understood that other feeder passageway cross-sectional geometries can also be defined and used in accordance with other embodiments of the present teachings. A few such exemplary feeder passageway geometries are described hereinafter with respect to FIGS. 6B-6E, respectively. It is to be understood that the viewer's perspective as depicted in each of FIGS. 6B-6E is analogous to that as depicted in FIG. 6A.

FIG. 6B depicts a side elevation detail view of a feeder passageway 112B in accordance with another embodiment. The feeder passageway 112B is defined by a cross-sectional geometry 114B. In turn, the cross-sectional geometry 114B is defined by a first curvilinear perimeter portion 118B1, and a second curvilinear perimeter portion 118B2. Typically, the first curvilinear perimeter portion 118B1 is defined by a corresponding upper body portion 102B, while the second curvilinear perimeter portion 118B2 is defined by a lower body portion 104B. It is assumed that the upper body portion 102B and the lower body portion 104B cooperate to fully define a corresponding atomizer (not shown), the other characteristics of which are otherwise generally as described above in accordance with the elements, features, and/or aspects of the atomizer 100 of FIGS. 1-5. In any case, the first and second curvilinear perimeter portions 118B1 and 118B2 are respectively cooperatively disposed such that a circular cross-sectional geometry 114B is defined.

FIG. 6C depicts a side elevation detail view of a feeder passageway 112C in accordance with still another embodiment. The feeder passageway 112C is defined by a cross-sectional geometry 114C. The cross-sectional geometry 114C, in turn, is defined by a linear perimeter portion 116C and a curvilinear perimeter portion 118C. As depicted in FIG. 6C, the curvilinear perimeter portion 118C is substantially parabolic (or semi-elliptical) in shape. Usually, the linear perimeter portion 116C is defined by an upper body portion 102C, while the curvilinear (parabolic or semi-elliptical) perimeter portion 118C is defined by a lower body portion 104C, of a corresponding atomizer (not shown). As also depicted in FIG. 6C, the upper body portion 102C further defines a pair of radius-edges 117C where the linear perimeter portion 116C transitions to the curvilinear perimeter portion 118C. In another embodiment (not shown), this radius-edging 117C is not included and a straight (flat, or planar) linear perimeter portion would be provided (see the linear perimeter portion 116 of FIG. 6A, for example). Other such radius-edges generally analogous to 117C can be suitably incorporated into other embodiments of feeder passageway according to the present teachings. It is assumed that the other characteristics of such an atomizer (not shown) are otherwise generally as described above in accordance with the elements, features and/or aspects of the atomizer 100 of FIGS. 1-5.

Figure 6E:
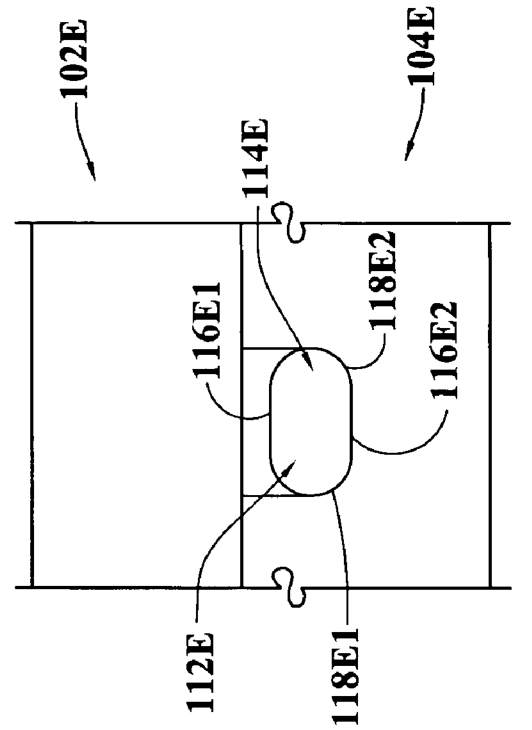
FIG. 6E is an elevation detail view depicting feeder passageway geometry in accordance with still another embodiment.
Figure 6D:
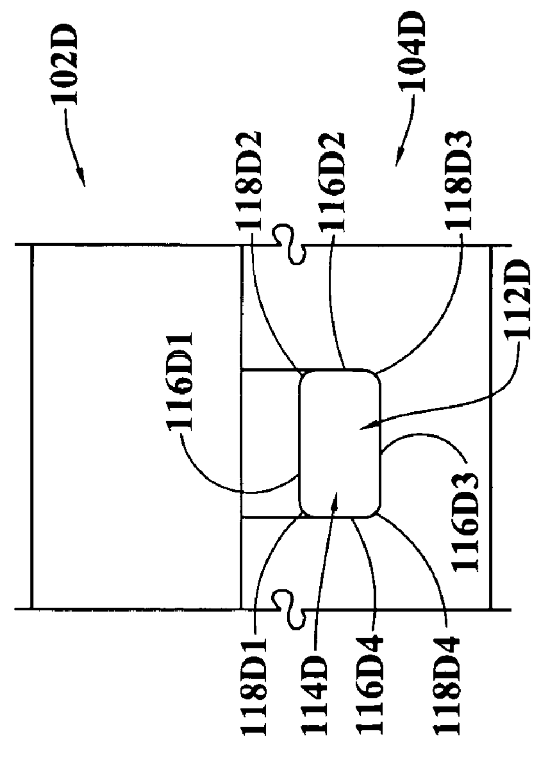
FIG. 6D is an elevation detail view depicting feeder passageway geometry in accordance with yet another embodiment.

FIG. 6D depicts a side elevation detail view of a feeder passageway 112D in accordance with yet another embodiment. The feeder passageway 112D is defined by a cross-sectional geometry 114D. The cross-sectional geometry 114D is defined by first, second, third and fourth linear perimeter portions 116D1, 116D2, 116D3 and 116D4, respectively, and first, second, third and fourth curvilinear perimeter portions 118D1, 118D2, 118D3 and 118D4, respectively. Typically, the first and second curvilinear perimeter portions 118D1 and 118D2, and the first linear perimeter portion 116D1, are defined by an upper body portion 102D. Furthermore, the third and fourth curvilinear perimeter portions 118D3 and 118D3, and the second, third and fourth linear perimeter portions 116D2, 116D3 and 116D4, are typically defined by a lower body portion 104D.

Such upper and lower body portions 102D and 104D cooperate to fully define a corresponding atomizer (not shown), the other characteristics of which are generally as described above in accordance with the elements, features and/or aspects of the atomizer 100 of FIGS. 1-5. The linear perimeter portions 116D1-D4, and the curvilinear perimeter portions 118D1-D4 define a cross-sectional geometry 114D that is generally like a radius-corner (i.e., rounded corner) rectangle. In one embodiment, the cross-sectional geometry 114D is such that a two-to-one (2:1) aspect ratio is defined. Other cross-sectional geometries 114D, defining other aspect ratios, can also be used.

FIG. 6E depicts a side elevation detail view of a feeder passageway 112E in accordance with still another embodiment. The feeder passageway 112E is defined by a cross-sectional geometry 114E. The cross-sectional geometry 114E is defined by first and second linear perimeter portions 116E1 and 116E2, as well as first and second curvilinear perimeter portions 118E1 and 118E2, respectively. Typically, a generally upper portion of each of the first and second curvilinear perimeter portions 118E and 118E2, and the first linear perimeter portion 116E1, are defined by an upper body portion 102E. Furthermore, a generally lower part of each of the first and second curvilinear perimeter portions 118E1 and 118E2, and the second linear perimeter portion 116E2, are usually defined by a lower body portion 104E.

It is to be understood that such upper and lower body portions 102E and 104E cooperate to fully define a corresponding atomizer (not shown), the other characteristics of which are otherwise as generally described above in regard to the elements, features and/or aspects of the atomizer 100 of FIGS. 1-5. Furthermore, each of the first and second curvilinear perimeter portions 118E1 and 118E2 are substantially semicircular in form. In this way, the first and second curvilinear perimeter portions 118E1 and 118E2 and the linear perimeter portions 116E1 and 116E2 define a cross-sectional geometry 114E that is substantially oval in shape.

Figure 6G:
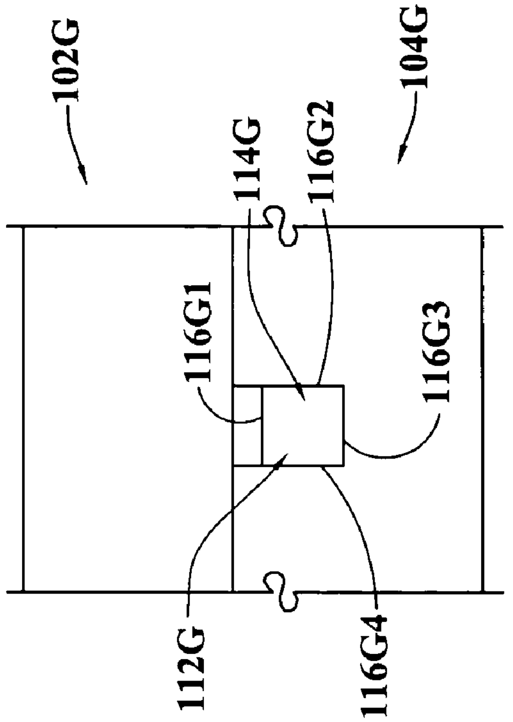
FIG. 6G is an elevation detail view depicting feeder passageway geometry in accordance with still another embodiment.
Figure 6F:
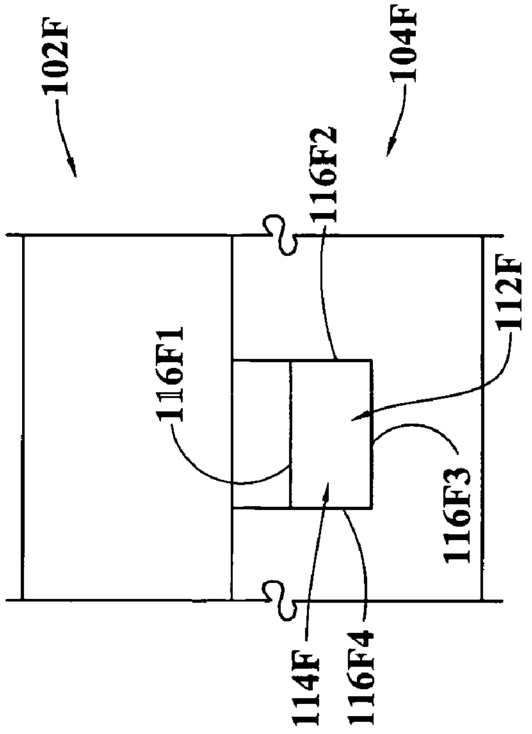
FIG. 6F is an elevation detail view depicting feeder passageway geometry in accordance with another embodiment.

FIG. 6F depicts a side elevation detail view of a feeder passageway 112F in accordance with still another embodiment. The feeder passageway 112F is defined by a rectangular cross-sectional geometry 114F. The rectangular cross-sectional geometry 114F is defined by first, second, third and fourth linear perimeter portions 116F1, 116F2, 116F3 and 116F4, respectively. Typically, the first linear perimeter portion 116F1 is defined by an upper body portion 102F, while the second, third and fourth linear perimeter portions 116F2-116F4 are usually defined by a lower body portion 104F. It is to be understood that such upper and lower body portions 102F and 104F cooperate to fully define a corresponding atomizer (not shown), the other characteristics of which are otherwise as generally described above in regard to the elements, features and/or aspects of the atomizer 100 (or variations thereon) of FIGS. 1-5, etc.

FIG. 6G depicts a side elevation detail view of a feeder passageway 112G in accordance with yet another embodiment. The feeder passageway 112G is defined by a square cross-sectional geometry 114G. The square cross-sectional geometry 114G is defined by first, second, third and fourth linear perimeter portions 116G1, 116G2, 116G3 and 116G4, respectively. Typically, the first linear perimeter portion 116G1 is defined by an upper body portion 102G, while the second, third and fourth linear perimeter portions 116G2-116G4 are usually defined by a lower body portion 104G. It is to be understood that such upper and lower body portions 102G and 104G cooperate to fully define a corresponding atomizer (not shown), the other characteristics of which are generally as described above in regard to the elements, features and/or aspects of the atomizer 100 (or variations thereon) of FIGS. 1-5, etc.

The FIGS. 6B-6G, as just described above, respectively depict at least some of the possible feeder passageway cross-sectional geometries that can be defined and used in accordance with the present teachings. However, it is to be understood that other feeder passageways (not shown) defining other cross-sectional geometries can also be defined and used. Thus, the teachings as depicted in FIGS. 6B-6G above are exemplary and non-limiting with respect to the present invention. Furthermore, it is to be understood that suitable combinations of differing feeder passageway geometries can be used within a particular embodiment of atomizer (not shown). As a non-limiting example, an embodiment of atomizer (not shown) can be used that defines two feeder passageways of circular cross-sectional geometry (e.g., 114B of FIG. 6B) and two feeder passageways of square cross-sectional geometry (e.g., 114G of FIG. 6G). One advantage of configuring the feeder passageways to have a curvilinear (or other) perimeter portion defined by one of the upper body portion or the lower body portion, and a linear perimeter portion to be defined by the other body portion, is that in assembly rotational orientation (i.e., registration) of the two body portions is not critical. That is, when the body portion defining the linear perimeter portion is generally flat, it will always define a linear perimeter portion of the passageway when placed in contact with the face of the other body portion that defines the remaining perimeter portion. This reduces assembly time and cost.

Figure 7:
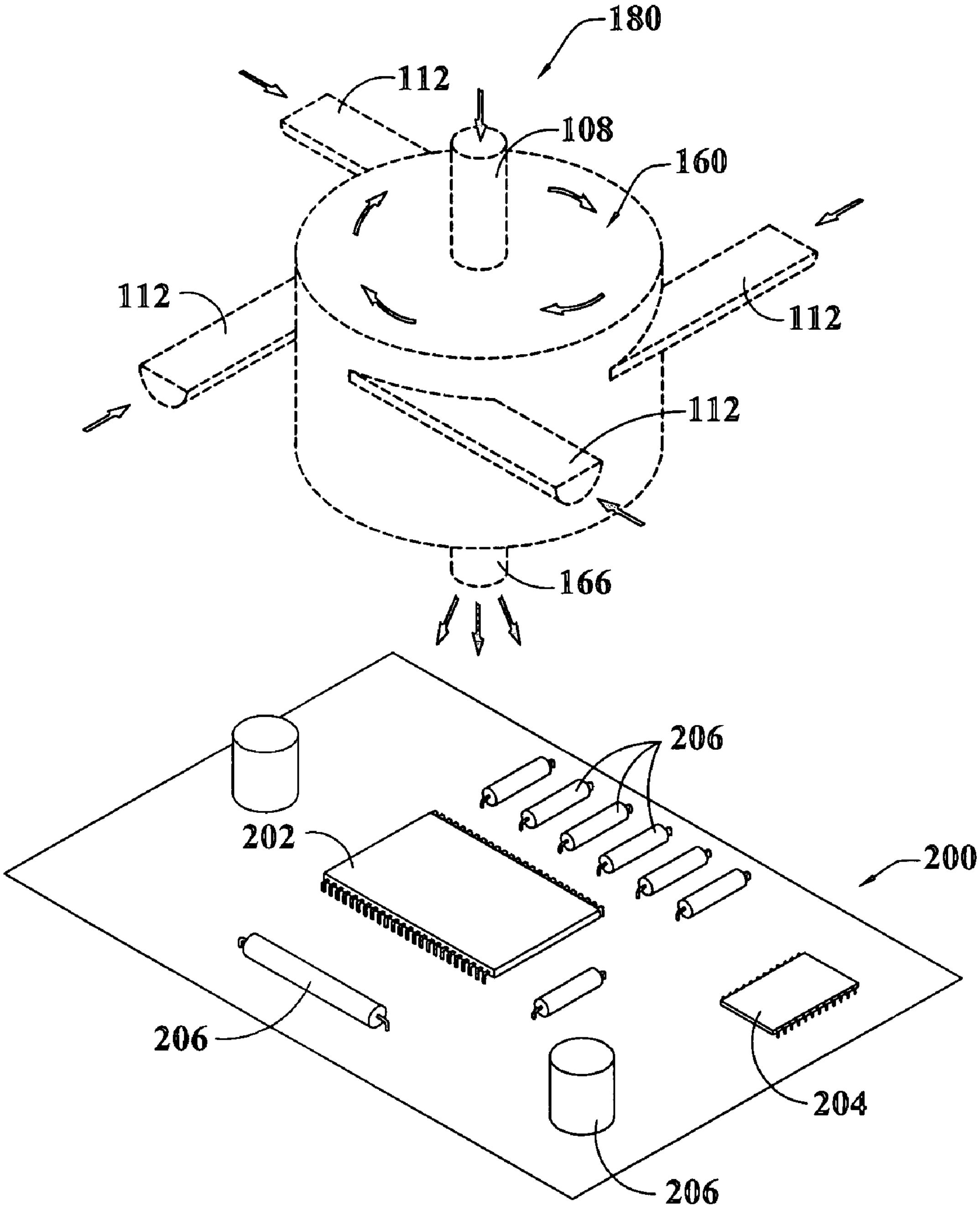
FIG. 7 is an isometric view depicting operation of an atomizer in accordance with another embodiment.

FIG. 7 is an isometric view depicting typical use of an atomizer in accordance with the present teachings. It is to be understood that FIG. 7 depicts selected portions (i.e., features) of the fluidicly communicative interior cavity defined by the atomizer 100, the elements and details of which are variously depicted in FIGS. 1-5, in hidden-line form, wherein such portions are collectively referred to as the cavity 180. Thus, FIG. 7 does not depict the structural (i.e., physical) atomizer 100 body, but rather selected portions of the interior cavity defined thereby. This is done in interest of clear understanding of the typical fluidic operation of the atomizer 100 (FIG. 1, etc.).

As depicted in FIG. 7, liquid flow is introduced into the cavity 180 by way of the entry passageway 108 and each of the feeder passageways 112. As a result of this inward flow, the liquid then swirls within the chamber portion 160 of the cavity 180. Such swirl of the liquid is readily induced by the tangential disposition of the feeder passageways 112 with respect to the chamber 160. At least some of the inertia (i.e., velocity head) of the liquid introduced into the entry passageway 108 is transferred to the swirling liquid within the chamber 160 as a generally axial force. Under this influence, the liquid then sprays out of the exit passageway 166 of the cavity 180 in the form of atomized droplets.

Any suitable liquid of sufficiently low viscosity and/or other characteristics can be atomized in this way. In one embodiment, the liquid is an electrically non-conductive coolant such as PF5060, which is available from 3M Company of St. Paul, Minn. As further depicted in FIG. 7, such an atomized liquid coolant is then sprayed (i.e., sputtered, or deposited) onto an exemplary electronic circuit card 200. The exemplary circuit card 200 includes integrated circuits 202 and 204 and various electronic components (e.g., resistors, diodes, capacitors, etc.) 206. It is to be understood that the exact constituency of the exemplary circuit card 200 is not relevant to an understanding of the present teachings. Under typical use, the coolant rapidly evaporates from the surface of such a circuit card 200 (or other heat-generating entity), thus providing an evaporative cooling effect. Use of the atomizers of the present invention (e.g., the atomizer 100 of FIG. 1, etc.) can be suitably applied, individually or in arranged groups, to the cooling of electrical and/or electronic devices or other equipment. The atomizers of the present teachings can also be put to other uses wherein the atomization and spraying (sputtering) of a liquid over the surface of an entity are required.

Figure 8:
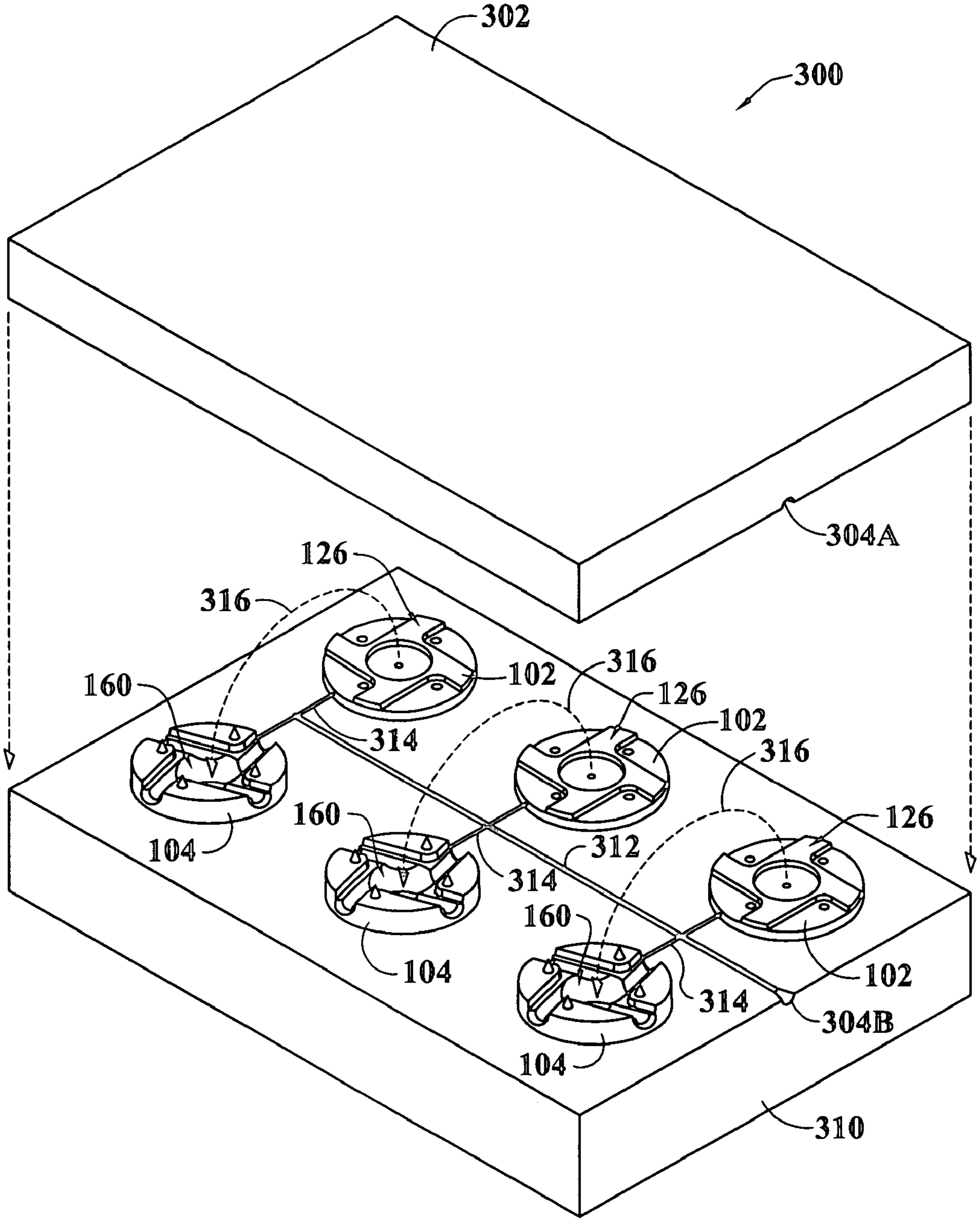
FIG. 8 is an isometric view depicting an injection mold in accordance with still another embodiment.

FIG. 8 is an isometric view depicting an injection mold (mold) 300 according to another embodiment of the present teachings. As depicted in FIG. 8, the mold 300 is configured to form a plurality of upper body portions 102 and a like-numbered plurality of lower body portions 104, respectively, as described above in regard to the elements, features and/or aspects of the atomizer 100 of FIGS. 1-5. Other molds (not shown) that are generally analogous to the mold 300 can also be defined and used for molding (forming) other embodiments of fluid atomizer in accordance with the present teachings.

The mold 300 includes an upper mold portion 302. The upper mold portion 302 can be formed (i.e., machined, etc.) from any suitable mold-making material such as, for example, brass, aluminum, stainless steel, etc. Other suitable materials can also be used to form the upper mold portion 302. In any case, the upper mold portion 302 is configured to form generally interior features of the upper and lower body portions 102 and 104, respectively, as described above primarily in regard to FIGS. 3-5. Such generally interior features include, for example, the raised feature 126, the chamber 160, etc.

The mold 300 also includes a lower mold portion 310. The lower mold portion 310 is configured to cooperatively mate, or interface, with the upper mold portion 302 during typical use (i.e., molding of atomizer body portions 102 and 104). The lower mold portion 310 can be formed or machined from any suitable materials such as those described above in regard to the upper mold portion 302. The lower mold portion 310 is configured to form generally exterior features of the upper and lower body portions 102 and 104, respectively, as described above primarily in regard to FIGS. 1-2. Such generally exterior features include, for example, the exterior surface 106, etc.

The upper mold portion 302 defines an upper portion 304A of an injection port, while the lower mold portion defines a lower portion 304B of the same injection port. In this way, the upper portion 304A and the lower portion 304B cooperate to define a complete injection port when the upper and lower mold portions 302 and 310 are respectively mated, or interfaced. In turn, the resulting injection port—as defined by portions 304A and 304B—defines an inward-extending aperture or fluid channel by which suitable material (e.g., molten thermoplastic, etc.) is injected into the mold 300 during typical operation (i.e., formation of upper and lower body portions 102 and 104).

The upper and lower mold portions 302 and 310 are also respectively configured such that a main sprue 312, and a plurality of branching sprues 314 extending therefrom, are formed during the injection molding process. The mold 300 is also configured such that each upper body portion 102 is formed opposite to a corresponding lower body portion 104. Thus, corresponding pairs of upper body portions 102 and lower body portions 104 are defined. Each upper body portion 102 and lower body portion 104 is coupled to, and symmetrical about, the main sprue 312 by a corresponding branch sprue 314.

The main sprue 312 can define a fold line (not shown), such as a "V" groove, such that each corresponding pair of upper body portion 102 and lower body portion 104 can be readily assembled (i.e., mated together and fused, sonically bonded, etc.) by simply folding the upper body portions 104 about the fold line of sprue 312 as indicated by paths 316. Typically, such assembly of the upper and lower body portions 102 and 104 occurs after the respective portions are solidified and removed from the mold 300. However, other suitable assembly procedures can also be used. Also, each branch sprue 314 is cut or severed away from the respective upper body portion 102 or lower body portion 104. In this way, a plurality of atomizers 100 (see FIG. 1) can be readily and economically produced by way of the injection mold 300.

As depicted by FIG. 8, the mold 300 is configured to form a total of three pairs of upper body portions 102 and lower body portions 104, thus resulting in three completely defined atomizers 100 (FIG. 1). However, one of ordinary skill in the art will appreciate that other molds (not shown) that are substantially analogous to the mold 300 can also be defined and used to form any suitable number of upper body portions 102 and lower body portions 104 according to the present teachings. Furthermore, it is to be understood that the mold 300 of FIG. 8 depicts just one configuration (i.e., layout, or mutual orientation) of upper and lower body portions 102 and 104 formed thereby, and that other suitable configurations can also be used in accordance with the present teachings. One of skill in the art is aware of standard injection molding and/or thermal casting techniques and procedures, and further elaboration is not needed here in order to understand use of the mold 300 in accordance with the overall scope of the present teachings.

Figure 9:
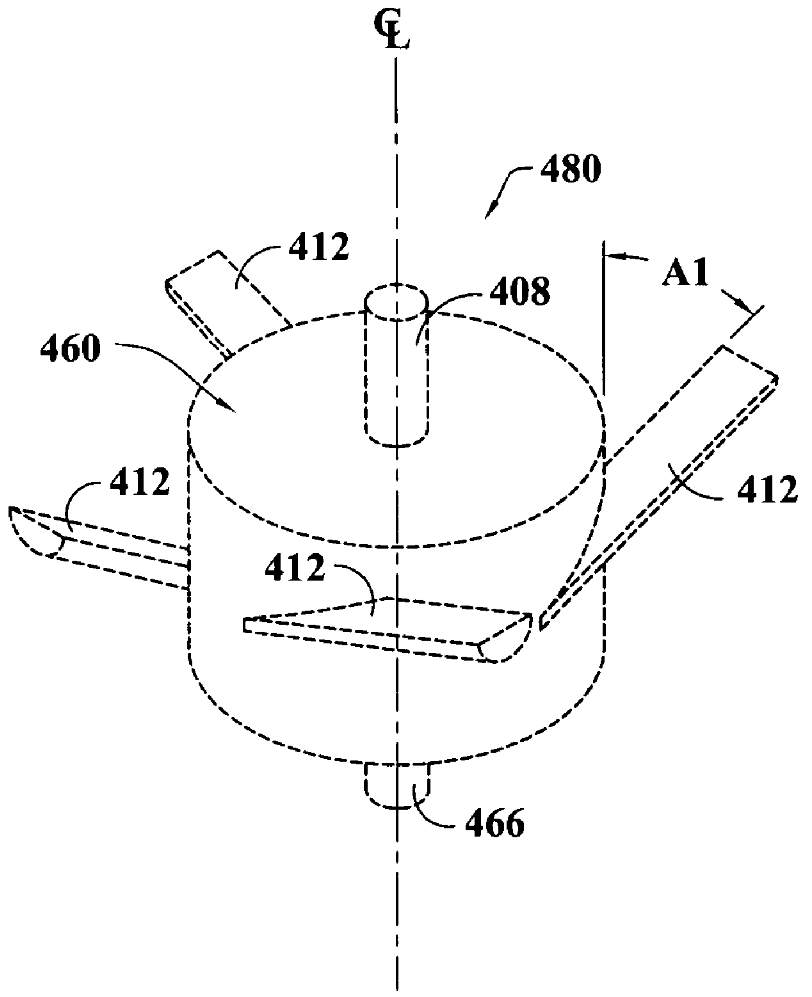
FIG. 9 is an isometric view depicting portions of an interior cavity of an atomizer according to yet another embodiment.

FIG. 9 is an isometric view depicting portions of a fluidicly communicative interior cavity of an atomizer according to another embodiment of the present teachings. The portions depicted in FIG. 9, in hidden-line form, are collectively referred to as the cavity 480. In this way, FIG. 9 does not depict the physical or structural aspects of the corresponding fluid atomizer, but rather selected portions (details) of the interior cavity defined thereby. This approach is taken in the interest of understanding the differences and similarities of the cavity 480 as compared to the interior cavity of the fluid atomizer 100 (i.e., FIG. 1, etc.).

As depicted in FIG. 9, the cavity 480 is defined in part by an entry passageway 408, a chamber 460 and an exit passageway 466, each of which is defined and configured substantially as described above in regard to the entry passageway 108, a chamber 160 and an exit passageway 166, respectively, of FIGS. 1-5. Any one or more of the entry passageway 408, the chamber 460, and/or the exit passageway 466 can be respectively varied in accordance with the present teachings. Also, other details, elements and/or variations of the interior cavity of the atomizer 100, as variously depicted in FIGS. 1-6E above, are selectively applicable to and serve to define the cavity 480 and the atomizer embodiment that it represents. One or more embodiments of atomizer corresponding to the cavity 480 can be formed and/or used substantially as defined above with respect to the embodiments and methods of FIGS. 1-8, and any suitable variations thereon.

The principle difference between the cavity 480, and the interior cavity defined by the atomizer 100 (FIG. 1, etc.), is now addressed. As depicted in FIG. 9, the cavity 480 is defined by four feeder passageways 412. Each of the feeder passageways 412 is tangentially and fluidly coupled to the chamber 460 and is understood to extend outward through the exterior surface (not shown) of an atomizer that defines the cavity 480. Also, each of the feeder passageways 412 can be selectively defined by any of the cross-sectional geometries 114-114E as respectively described above with respect to FIGS. 1 and 6A-6E. However, each of the feeder passageways 412 extends away from the chamber 460 at an acute angle "A1" with respect to a central axis "CL" of the cavity 480. This is distinct from the configuration of feeder passageways 112 of the atomizer 100 (FIGS. 1-5) that lie in a mutually common plane. In one embodiment, each of the feeder passageways 412 is defined such that the angle A1 is about fifty-nine degrees of arc. Other suitable angles A1 can also be defined. In this way, each of the feeder passageways 412 extends generally toward the same end of the cavity 480 as defined by the entry passageway 408.

During typical operation of an atomizer (not shown) corresponding to the cavity 480, liquid is introduced as before into each of the entry passageway 408 and the feeder passageways 412. The tangentially disposed configuration of the feeder passageways 412 serves to induce swirl of the liquid within the chamber 460. Additionally, the angled disposition (i.e., angle A1) of the feeder passageways 412 results in increased velocity of the droplets (not shown) exiting by way of the exit passageway 466, relative to that typically achieved during operation of the atomizer 100 (see FIG. 1). Therefore, embodiments corresponding to the cavity 480 of FIG. 9 can be useful where increased spray velocity is required.

Figure 10:
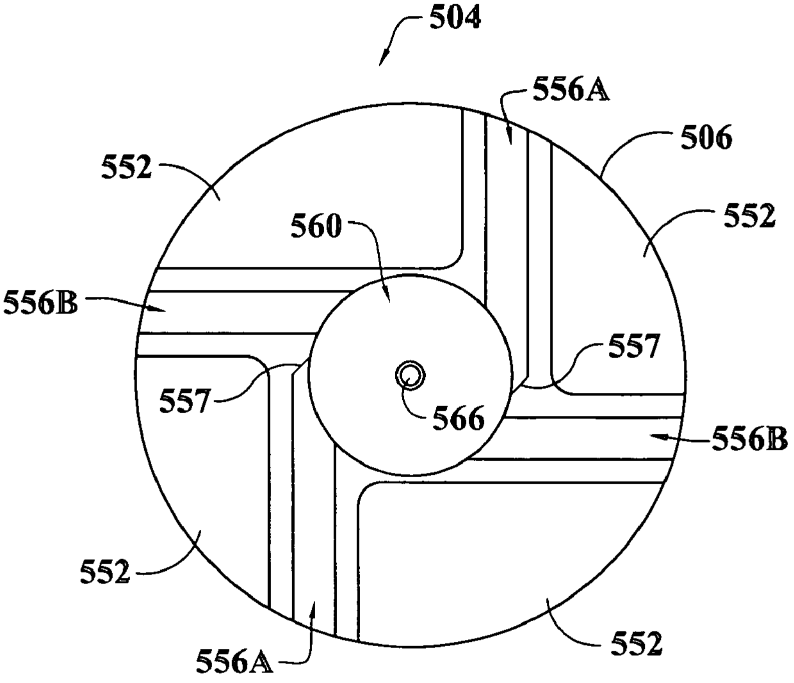
FIG. 10 a plan view depicting a second body portion in accordance with another embodiment.

FIG. 10 is a plan view depicting a lower (i.e., second) body portion 504 in accordance with another embodiment of atomizer of the present teachings. As depicted in FIG. 10, the observer is looking generally toward upper end and interior details (fluid cavity, etc.) defined by the lower body portion 504. As such, the lower body portion 504 defines an outer surface 506, four lower contact areas 552, a chamber 560 and an exit passageway 566 that are defined, configured and operable substantially as described above in regard to the outer surface 106, the lower contract areas 152, the chamber 160 and the exit passageway 166, respectively, of the lower body portion 104 of FIGS. 1 and 4-5. It is to be understood that the lower body portion 504 of FIG. 10 is intended to be bonded to a suitably configured upper body portion (e.g., 102 of FIG. 2-3 or a variation thereon, etc.) so as to fully define a corresponding fluid atomizer body according to the present teachings.

The lower body portion 504 also defines two channels 556A. Each of the channels 556A extends away from the chamber 560 in an over-tangential orientation therewith, outward through the outer surface 506 of the lower body portion 504. Also, the lower body portion 504 defines an angled wall (or transition) portion 557 corresponding to each channel 556A. In this way, each of the channels 556A defines a perimeter or interior wall portion of a feeder passageway (fluid conduit) that extends from the chamber 560 to outside of the lower body portion 504.

The lower body portion 504 further defines two channels 556B. Each of the channels 556B extends away from chamber 560 in an under-tangential orientation therewith, outward through the exterior surface 506 of the lower body portion 504. Thus, each of the channels 556B defines an interior wall portion of a feeder passageway extending from the chamber 560 to outside of the lower body portion 504. While not depicted in specific detail in FIG. 10, it is to be understood that the cross-sectional geometry of such channels 556A and 556B can be defined in accordance with any suitable such geometry of the present teachings (e.g., semi-circular, parabolic, rectangular, elliptical, etc.).

As depicted in FIG. 10, the lower body portion 504 defines a portion of each of a pair of over-tangential feeder passageways and a pair of under-tangential feeder passageways (i.e., channels 556A and 556B, respectively). Other embodiments (not shown) of lower body portion can be defined and used that incorporate only one type of feeder passageway such as, for example, only over-tangential channels 556A. Furthermore, other embodiments (not shown) of lower body portion 504 can be defined and used that incorporate other numbers of such feeder passageways 556A and/or 556B. It will also be appreciated that the tangential feeder passageways (156, FIG. 4) can be used in conjunction with over- or under-tangential feeder passageways.

Figure 11:
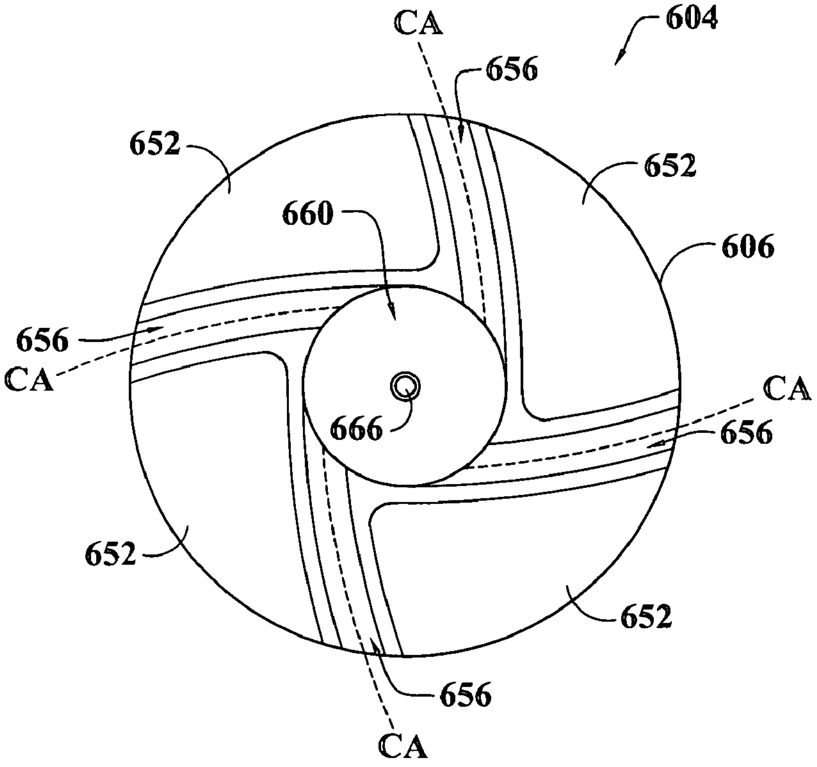
FIG. 11 is a plan view depicting a second body portion in accordance with still another embodiment.

FIG. 11 is a plan view depicting a lower (or second) body portion 604 in accordance with yet another embodiment of atomizer of the present teachings. As depicted in FIG. 11, the observer is looking generally toward interior details defined by the lower body portion 604. The lower body portion 604 defines an outer surface 606, four lower contact areas 652, a chamber 660 and an exit passageway 666 that are defined, configured and operable substantially as described above in regard to the outer surface 106, the lower contract areas 152, the chamber 160 and the exit passageway 166, respectively, of the lower body portion 104 of FIG. 1, etc. It is to be further understood that the lower body portion 604 of FIG. 11 is intended to be bonded to a suitably configured upper body portion (e.g., see the upper body portion 102 of FIG. 2, etc.) so as to fully define a corresponding fluid atomizer body according to the present teachings.

The lower body portion 604 also defines four channels 656. Each of the channels 656 is further defined by a curvilinear central axis "CA". Furthermore, each channel 656 extends away from the chamber 660 outward through the exterior surface 606 of the lower body portion 604. In this way, each channel 656 defines an interior wall portion of a generally curved (arcing, or non-linear) feeder passageway extending from outside of the lower body portion 604 inward to the chamber 660. While not specifically depicted in FIG. 11, it is to be understood that the cross-sectional geometry of each such channel 656 can be defined in accordance with any suitable geometry of the present teachings (e.g., semi-circular, parabolic, elliptical, etc.). Thus, the lower body portion 604 as depicted in FIG. 11 provides a portion of another embodiment of fluid atomizer according to the present teachings wherein, during typical use, additional swirl is imparted to the liquid within the chamber 650 as compared to that generally achieved during use of the atomizer 100 of FIGS. 1-5 above.

Figure 12:
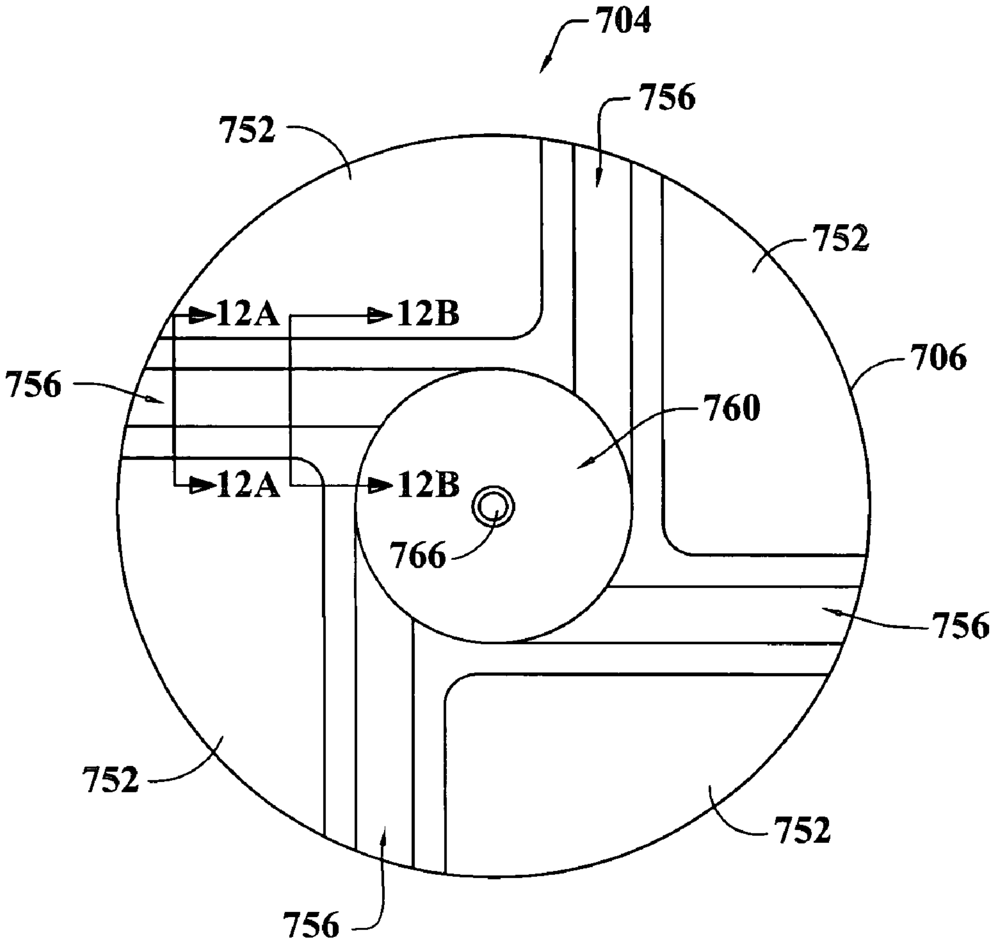
FIG. 12 is a plan view depicting a second body portion in accordance with yet another embodiment.

FIG. 12 is a plan view depicting a lower (or second) body portion 704 in accordance with another embodiment of atomizer of the present teachings. As depicted in FIG. 12, the observer is looking generally toward interior details defined by the lower body portion 704. The lower body portion 704 defines an outer surface 706, four lower contact areas 752, a chamber 760 and an exit passageway 766 that are defined, configured and operable substantially as described above in regard to the outer surface 106, the lower contract areas 152, the chamber 160 and the exit passageway 166, respectively, of the lower body portion 104 of FIG. 1, etc. It is to be further understood that the lower body portion 704 of FIG. 12 is intended to be bonded to a suitably configured upper body portion (e.g., 102 of FIG. 2, or a variation thereon, etc.) so as to fully define a corresponding fluid atomizer body according to the present teachings.

The lower body portion 704 also defines four channels 756. Each of the channels 756 extends tangentially away from the chamber 760 outward through the exterior surface 706 of the lower body portion 704. Each of the channels 756 is further defined by a cross-sectional geometry that gradually changes (transitions in) shape as it extends from the outer surface 706 to the chamber 760. Further exemplary details of this shape-changing aspect are described below in accordance with FIGS. 12A and 12B. In any case, each channel 756 defines an interior wall portion of a feeder passageway extending from outside of the lower body portion 704 inward to the chamber 760.

Figure 12A:
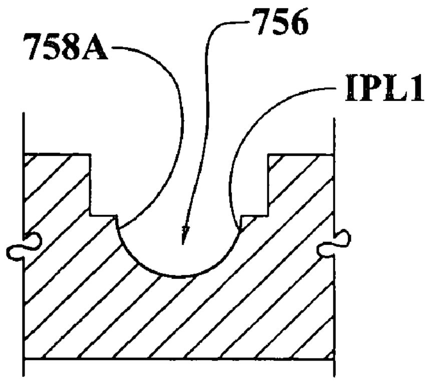
FIG. 12A is an elevation sectional view depicting details of the embodiment of FIG. 12.
Figure 12B:
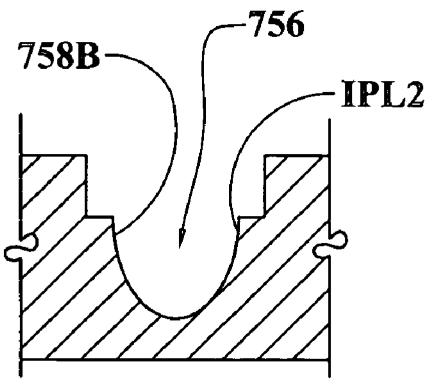
FIG. 12B is an elevation sectional view depicting details of the embodiment of FIG. 12

FIGS. 12A and 12B are elevation sectional views depicting respective cross-sections of a channel 756 of FIG. 12. At section 12A, the channel 756 is defined by a semicircular wall surface 758A, defining an interior perimeter length "IPL1". At section 12B, the channel 756 is defined by a parabolic (or quasi-elliptical) wall surface 758B, in turn defining an interior perimeter length "IPL2". The semicircular and parabolic wall surfaces 758A and 758B can, for example, be used in conjunction with a suitable embodiment of upper body portion (102, etc.) such that an enclosed feeder passageway having a linear perimeter portion is defined. Other cross-sectional shape combinations are also possible under the present teachings.

FIGS. 12-12B depict one possible embodiment wherein each channel 756 (and each feeder passageway partially defined thereby) transitions from a semicircular perimeter portion (i.e., 758A) to a parabolic perimeter portion (i.e., 758B). However, it is to be understood that other embodiments (not shown) can be defined and used wherein the corresponding channels gradually shift from any desirable shape to any other (e.g., semicircular to oval, parabolic to full circular, semicircular to square, etc.). As also depicted in FIGS. 12A-12B, the channels 756 are defined such that the interior perimeter lengths IPL2 is greater than IPL1—that is, they vary with respect to each other. In another embodiment (not shown), each of the channels 756 is defined so as to gradually change in cross-sectional shape while maintaining a constant interior perimeter length (i.e., IPL1 equals IPL2).

Figure 13:
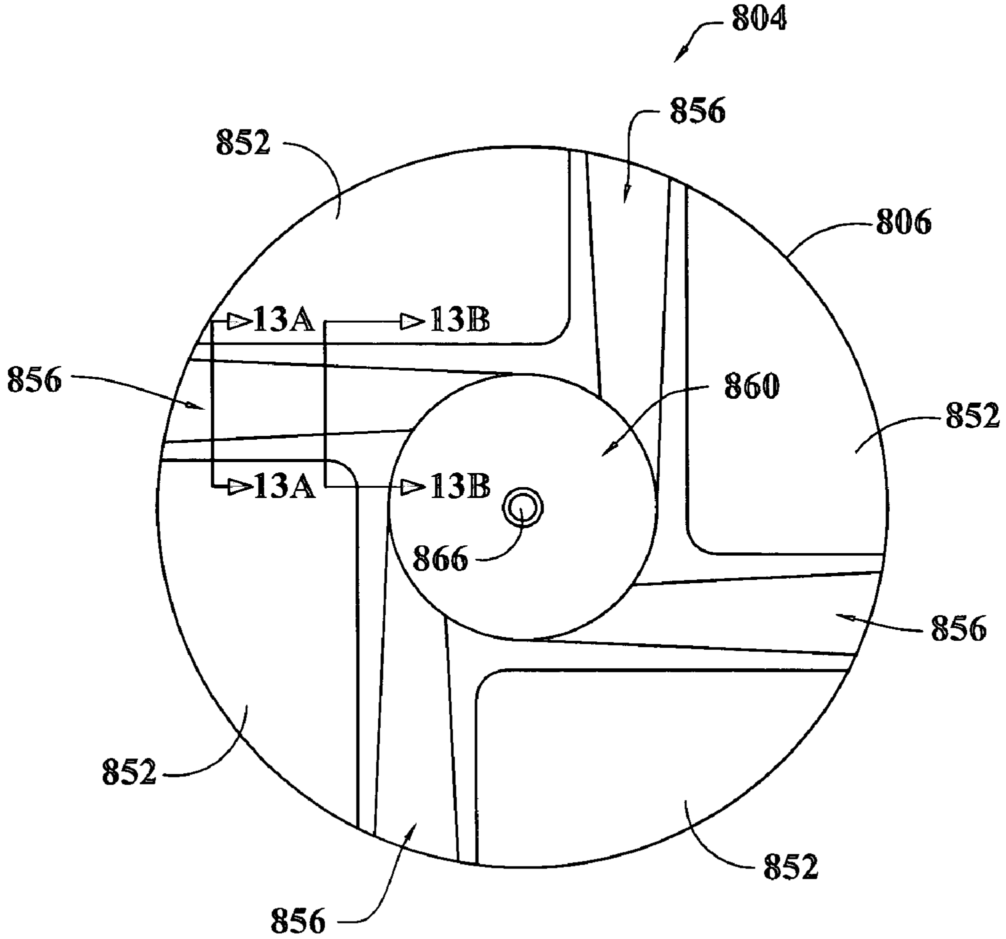
FIG. 13 is a plan view depicting a second body portion in accordance with another embodiment.

FIG. 13 is a plan view depicting a lower (or second) body portion 804 in accordance with another embodiment of atomizer of the present teachings. As depicted in FIG. 13, the observer is looking generally toward interior details (interior cavity, etc.) defined by the lower body portion 804. The lower body portion 804 defines an outer surface 806, four lower contact areas 852, a chamber 860 and an exit passageway 866 that are defined, configured and operable substantially as described above in regard to the outer surface 106, the lower contact areas 152, the chamber 160 and the exit passageway 166, respectively, of the lower body portion 104 of FIGS. 1, 4, 5, etc. It is to be further understood that the lower body portion 804 of FIG. 13 is intended to be bonded to a suitably configured upper body portion (e.g., 102 of FIGS. 2 and 3, or a variation thereon, etc.) so as to fully define a corresponding fluid atomizer body according to the present teachings.

The lower body portion 804 also defines four channels 856. Each of the channels 856 extends away from the chamber 860 outward through the exterior surface 806 of the lower body portion 804. Each of the channels 856 is further defined by a cross-sectional geometry that gradually changes size, while maintaining similar (i.e., the same) geometric shape, as it extends from the outer surface 806 to the chamber 860. Further exemplary details of this size-changing aspect are described below in accordance with FIGS. 13A and 13B. In any event, each channel 856 defines an interior wall portion of a feeder passageway extending from outside of the lower body portion 804 inward to the chamber 860.

Figure 13A:
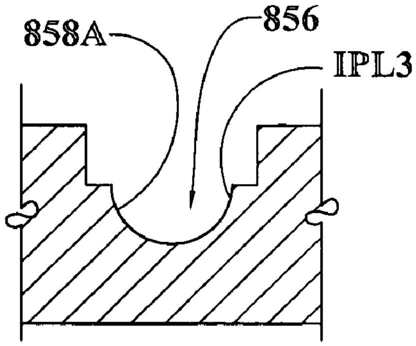
FIG. 13A is an elevation sectional view depicting details of the embodiment of FIG. 13.
Figure 13B:
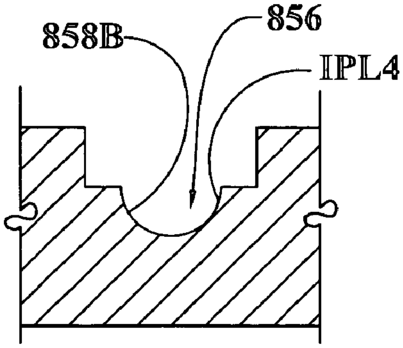
FIG. 13B is an elevation sectional view depicting details of the embodiment of FIG. 13.

FIGS. 13A and 13B are elevation sectional views depicting respective cross-sections of the channel 856 of FIG. 13. At both sections 13A and 13B, the channel 856 is defined by a semicircular wall surface 858A and 858B, respectively. Each wall surface 858A and 858B defines an interior perimeter length "IPL3" and "IPL4", respectively, wherein the interior perimeter length IPL4 is less than IPL3. Furthermore, the wall surfaces 858A and 858B can be used, for example, in conjunction with a suitable embodiment of upper body portion (e.g., a suitable variation on the upper body portion 102 of FIGS. 2 and 3, etc.) such that an enclosed feeder passageway having a linear perimeter portion is defined. Other feeder passageway cross-sectional shape combinations are also possible.

FIGS. 13-13B depict one embodiment wherein each semicircular channel 856 (and each feeder passageway partially defined thereby) gradually shifts from a first interior perimeter size to a second interior perimeter size. Nonetheless, it is to be understood that other embodiments (not shown) can be defined and used wherein the corresponding channels (e.g., 856, etc.) are of any desirable shape that gradually shifts in size as the channels extend from the outer surface to the interior chamber (e.g., oval, parabolic, square, etc.). Furthermore, such change in size can taper in either direction—expanding in size as the channels extend toward the chamber, or vise versa.

Figure 14B:
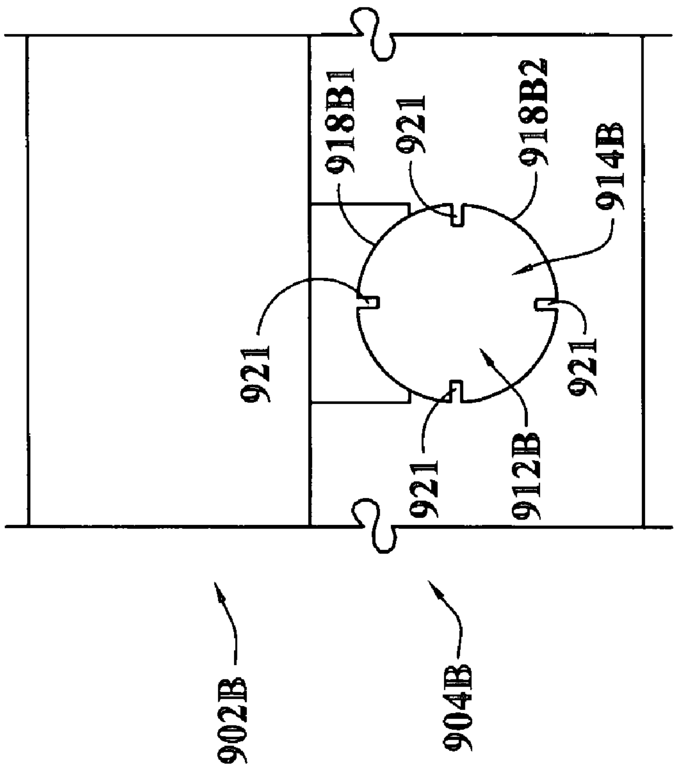
FIG. 14B is an elevation detail view depicting feeder passageway geometry in accordance with still another embodiment.
Figure 14A:
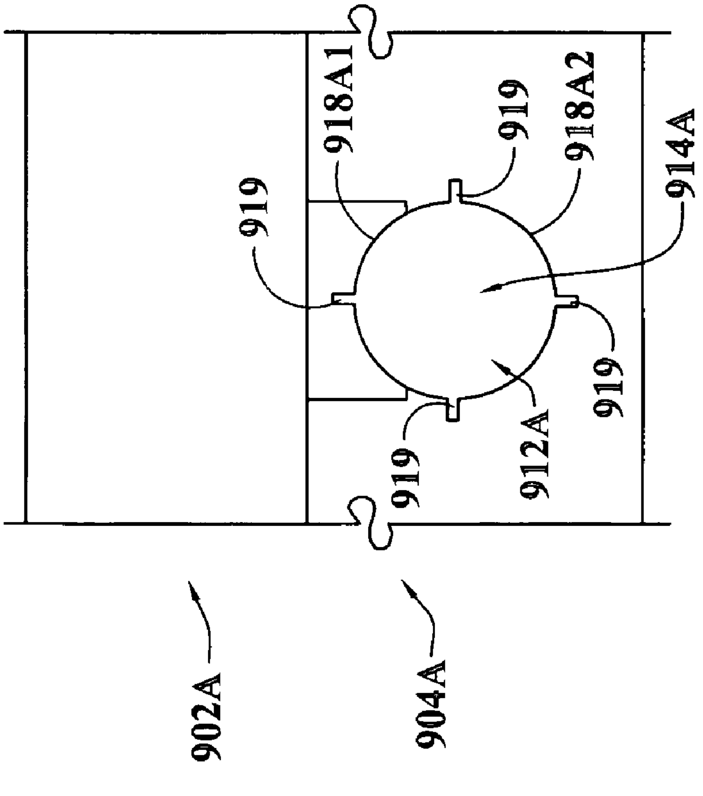
FIG. 14A is an elevation detail view depicting feeder passageway geometry in accordance with another embodiment.

FIG. 14A depicts a side elevation detail view of a feeder passageway 912A in accordance with another embodiment. The feeder passageway 912A is defined by a cross-sectional geometry 914A. In turn, the cross-sectional geometry 914A is defined by a first curvilinear perimeter portion 918A1, and a second curvilinear perimeter portion 918A2. Typically, the first curvilinear perimeter portion 918A1 is defined by a corresponding upper body portion 902A, while the second curvilinear perimeter portion 914A2 is defined by a lower body portion 904A. It is assumed that the upper body portion 902A and the lower body portion 904A cooperate to fully define a corresponding atomizer (not shown), the other characteristics of which are otherwise generally as described above in accordance with the elements, features and/or aspects of the atomizer 100, or variations thereon, of FIGS. 1-5, etc. As depicted in FIG. 14A, the first and second curvilinear perimeter portions 918A1 and 918A2 are respectively cooperatively disposed such that a circular cross-sectional geometry 914A is defined. Other cross-sectional geometries can also be used (oval, square, etc.).

As further depicted in FIG. 14A, the upper and lower body portions 902A and 904A are respectively configured to define a plurality of swirl channels 919. Each of the swirl channels 919 is understood to extend along the length of the feeder passageway 912A. Furthermore, the swirl channels 919 are defined such that each spirals, or twists, about a central axis (not shown) of the corresponding feeder passageway 912A as the channel 919 extends from an outer surface (e.g., outer surface 106 of FIG. 1, etc.) into an interior chamber (e.g., chamber 160 of FIG. 4, etc.). Thus, the swirl channels 919 are somewhat comparable to the rifling of a gun barrel. In this way, the swirl channels 919 generally serve to induce swirl or spin in a liquid flowing into a corresponding embodiment of atomizer so equipped (not shown), during typical use. While the swirl channels 919 as depicted in FIG. 14A are defined by a substantially rectangular cross-section, it is to be understood that other suitable cross-sectional geometries can also be used (e.g., semicircular, elliptical, etc.)

FIG. 14B depicts a side elevation detail view of a feeder passageway 912B in accordance with another embodiment. The feeder passageway 912B is defined by a cross-sectional geometry 914B. In turn, the cross-sectional geometry 914B is defined by a first curvilinear perimeter portion 918B1, and a second curvilinear perimeter portion 918B2. Typically, the first curvilinear perimeter portion 918B1 is defined by a corresponding upper body portion 902B, while the second curvilinear perimeter portion 914B2 is defined by a lower body portion 904B. It is assumed that the upper body portion 902B and the lower body portion 904B cooperate to fully define a corresponding atomizer (not shown), the other characteristics of which are otherwise generally as described above in accordance with the elements, features and/or aspects of the atomizer 100 of FIGS. 1-5, etc. As also depicted in FIG. 14B, the first and second curvilinear perimeter portions 918B1 and 918B2 are respectively cooperatively disposed such that a generally circular cross-sectional geometry 914B is defined. However, other suitable cross-sectional geometries 914B can also be defined and used (e.g., oval, elliptical, etc.).

As further depicted in FIG. 14B, the upper and lower body portions 902B and 904B are respectively configured to define a plurality of swirl vanes 921. Each of the swirl vanes 921 is understood to extend along the length of the feeder passageway 912B. Furthermore, the swirl vanes 921 are defined such that each spirals, or twists, about a central axis (not shown) of the corresponding feeder passageway 912B as the vane 921 extends from an outer surface (e.g., outer surface 106 of FIG. 1, etc.) into an interior chamber (e.g., chamber 160 of FIG. 4, etc.). In this way, the swirl vanes 921 generally serve to induce swirl or spin in a liquid flowing into a corresponding embodiment of atomizer so equipped (not shown), during typical use. While the swirl channels 921 as depicted in FIG. 14B are defined by a substantially rectangular cross-section, it is to be understood that other suitable cross-sectional geometries can also be used (semi-elliptical, triangular, etc.)

Figure 15:
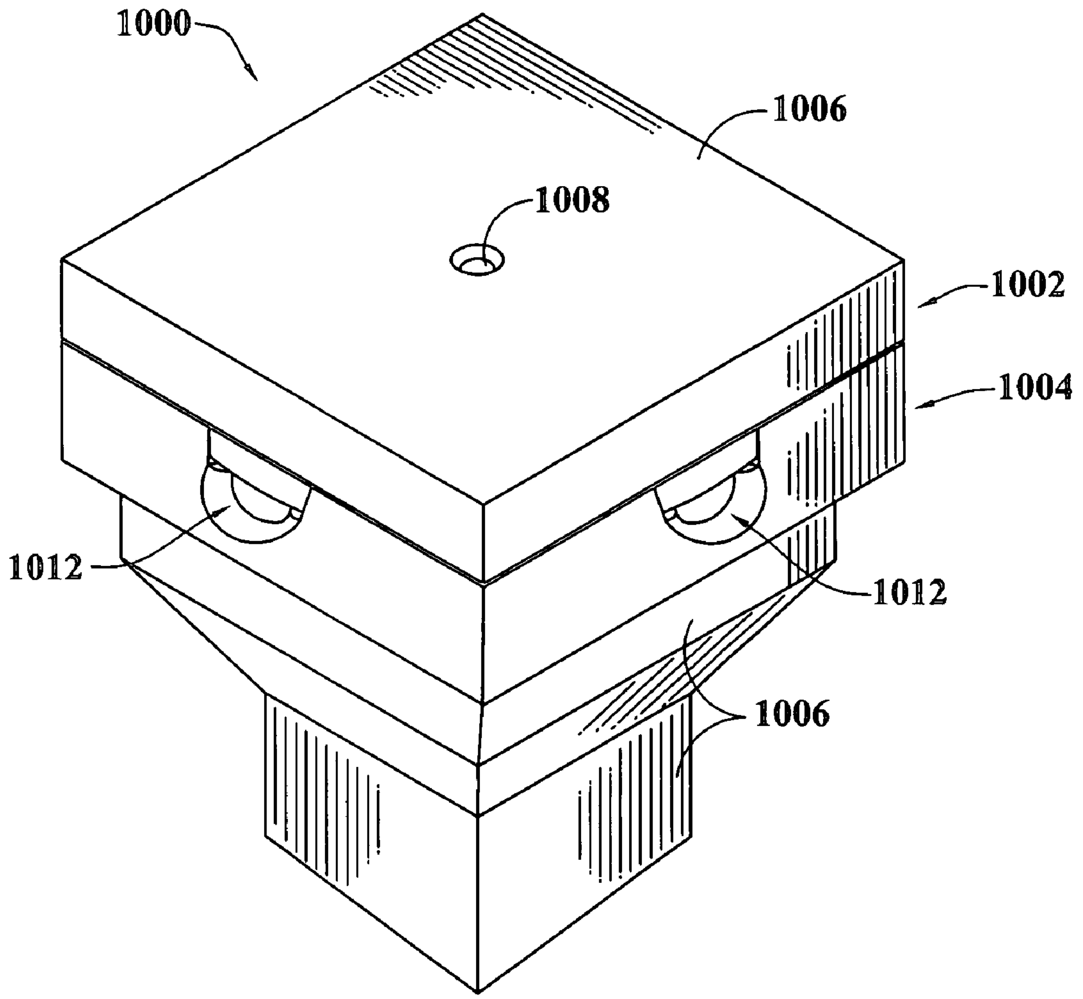
FIG. 15 is an isometric view depicting an atomizer according to another embodiment.

FIG. 15 is an isometric view depicting an atomizer 1000 in accordance with another embodiment of the present invention. As depicted in FIG. 15, the atomizer 1000 is comprised of an upper body portion 1002 and a lower body portion 1004 that are respectively formed and fused or otherwise suitably joined or bonded together, so as to define the atomizer 1000 as a one-piece entity. The atomizer 1000 (i.e., the upper body portion 1002 and/or the lower body portion 1004) can be formed from any suitable material such as, for example, thermoplastic, brass, aluminum, stainless steel, etc. Any other suitable material can also be used to form the atomizer 1000. The atomizer 1000 defines an entry passageway 1008, a plurality of feeder passageways 1012, a fluidicly communicative interior cavity (not shown), an exit passageway (not shown) and an outer expansion (not shown) that are respectively configured and operable substantially as described above in regard to the entry passageway 108, the feeder passageways 112, the fluidicly communicative interior cavity, the exit passageway 166 and the outer expansion 168 of the atomizer 100 (and variations thereon) of FIGS. 1-5, etc. Particular characteristics of the atomizer 1000 are depicted in FIG. 15 for purposes of example. However, it is to be understood that the atomizer 1000 of FIG. 15 is substantially analogous in configuration and operation to the atomizer 100, and/or any suitable variations thereon, as described above, except as noted hereinafter.

The atomizer 1000 also defines an exterior surface 1006. The exterior surface 1006 is configured such that the upper body portion 1002 and the lower body portion 1004 define a substantially square outer cross-sectional shape. This overall square cross-sectional shape of the atomizer 1000 provides for straightforward registration (i.e., rotational alignment, or indexing) of the upper body portion 1002 with the lower body portion 1004 during assemblage and bonding. In this way, for example, the upper and lower body portions 1002 and 1004 can be formed by injection molding and then mated within a support tube or jig of correspondingly square cross-sectional shape during bonding by way of laser (or sonic) welding. Other suitable support means can also be used during assemblage of the atomizer 1000.

While the atomizer 1000 defines a square outer shape, other embodiments (not shown) can also be used respectively defining other outer cross-sectional shapes (e.g., hexagonal, octagonal, triangular, etc.) that facilitate simple registration of the corresponding upper and lower body portions. Other methods and/or configurations directed to keying or indexing an upper body portion (e.g., 102 of FIG. 1, etc.) with a lower body portion (e.g., 104 of FIG. 1, etc.) can also be used in accordance with the present teachings.

It is understood that the invention can be embodied in other specific forms not described that do not depart from its spirit or essential characteristics. The described embodiments are to be considered in all respects only as illustrative and not restrictive, the scope of the invention being defined by the appended claims and equivalents thereof.

We claim:

1. An injection mold, comprising:

an injection mold configured to form at least one portion of one or more fluid atomizer bodies;

wherein the injection mold is further configured to form at least one first body portion and at least one second body portion and each fluid atomizer body is defined by one first body portion bonded to one second body portion so as to define a singular entity;

wherein the injection mold is further configured such that:

each of one of the first and second body portions defines at least one raised portion; and each of the other of the first and second body portions defines at least one recessed portion, each recessed portion configured to matingly receive one of the raised portions when one of the first body portions and one of the second body portions are bonded together so as to define the singular entity;

wherein the injection mold is further configured to:

form one or more first body portions;

form one or more second body portions, each second body portion disposed opposite of a corresponding one of the first body portions and configured to be matingly bonded thereto so as to define a corresponding fluid atomizer body as a singular entity; and form a sprue disposed between the one or more first body portions and the one or more second body portions, wherein the sprue defines a fold-line such that when folded about the fold line each first body portion is brought into matable contact with the corresponding oppositely disposed second body portion;

wherein the injection mold is further configured such that each fluid atomizer body defines an exterior surface and a fluidicly communicative interior cavity, the interior cavity of each fluid atomizer body defined by:

an entry passageway portion extending through the exterior surface of the fluid atomizer body;

a chamber portion coupled to the entry passageway portion, the chamber portion defining a cylindrical portion and a tapered portion;

at least one feeder passageway portion extending tangentially from the cylindrical portion of the chamber portion through the exterior surface of the fluid atomizer body; and an exit passageway portion extending from the tapered portion of the chamber portion through the exterior surface of the fluid atomizer body.

2. The injection mold of claim 1, wherein the injection mold is further configured such that at least a portion of each feeder passageway portion of the interior cavity of each fluid atomizer body is defined by a cross-sectional area comprising a curvilinear perimeter portion and a linear perimeter portion.

3. The injection mold of claim 2, wherein the injection mold is further configured such that the curvilinear perimeter portion of the cross-sectional area portion of each feeder passageway portion of the interior cavity is further defined by one of a circular perimeter portion, a parabolic perimeter portion, or an elliptical perimeter portion.

4. The injection mold of claim 1, wherein the injection mold is further configured such that at least a portion of each feeder passageway portion of the interior cavity of each fluid atomizer body is defined by a cross-sectional area comprising at least two liner perimeter portions and at least two curvilinear perimeter portions.

5. The injection mold of claim 1, wherein the injection mold is further configured such that:

the chamber portion of the interior cavity of each fluid atomizer body is defined by a central axis; and each feeder passageway portion of the interior cavity of each fluid atomizer body extends tangentially away from the cylindrical portion of the chamber portion and at a predetermined angle with respect to the central axis.

6. The injection mold of claim 5, wherein the injection mold is further configured such that the predetermined angle is about fifty-nine degrees of arc.

7. The injection mold of claim 1, wherein the injection mold is further configured such that:

each first body portion defines at least part of the entry passageway portion of the interior cavity of the fluid atomizer body partially defined thereby; and each second body portion defines at least part of the chamber portion and the at least one feeder passageway portion and the exit passageway portion of the interior cavity of the fluid atomizer body partially defined thereby.

8. The injection mold of claim 1, wherein the injection mold is further configured such that the interior cavity of each fluid atomizer body defines four feeder passageway portions extending tangentially from the cylindrical portion of the chamber portion through the exterior surface of the corresponding fluid atomizer body.

9. The injection mold of claim 1, wherein the injection mold is further configured such that each fluid atomizer body defines an exit expansion cavity, the exit expansion cavity in fluid communication with the exit passageway portion of the interior cavity.

10. The injection mold of claim 1, wherein the injection mold is further configured such that each feeder passageway portion of the interior cavity of each fluid atomizer body is defined by a hydraulic diameter in the range of about 225 to about 381 microns.

11. The injection mold of claim 1, wherein the injection mold is further configured such that the exit passageway portion of the interior cavity of each fluid atomizer body is defined by an exit diameter and an exit length; and the ratio of the exit length to the exit diameter is in the range of about 0.50 to about 0.90.

12. The injection mold of claim 1, wherein the injection mold is further configured such that the exit passageway portion of the interior cavity of each fluid atomizer body is defined by a radius edge entry portion and a right-angle edge exit portion; and the radius of the radius edge entry portion is about 0.0042 inches.

13. The injection mold of claim 1, wherein the injection mold is further configured such that the entry passageway portion of the interior cavity of each fluid atomizer body is defined by a diameter of about 0.021 inches.

14. The injection mold of claim 1, wherein the injection mold is further configured such that the chamber portion of the interior cavity of each fluid atomizer body is defined by a height of about 0.0406 inches and a diameter of about 0.063 inches.

* * * * *